United States Patent
Kiang et al.

(10) Patent No.: US 8,868,574 B2
(45) Date of Patent: Oct. 21, 2014

(54) SYSTEM AND METHOD FOR ADVANCED SEARCH AND FILTERING MECHANISMS FOR ENTERPRISE ADMINISTRATORS IN A CLOUD-BASED ENVIRONMENT

(71) Applicant: Box, Inc., Los Altos, CA (US)

(72) Inventors: Andy Kiang, Mountain View, CA (US); Kevin Tu, San Francisco, CA (US); Philip Sheffield, San Francisco, CA (US); Anurag Pandit, Mountain View, CA (US)

(73) Assignee: Box, Inc., Los Altos, CA (US)

( * ) Notice: Subject to any disclaimer, the term of this patent is extended or adjusted under 35 U.S.C. 154(b) by 0 days.

(21) Appl. No.: 13/953,668

(22) Filed: Jul. 29, 2013

(65) Prior Publication Data
US 2014/0032575 A1 Jan. 30, 2014

Related U.S. Application Data

(60) Provisional application No. 61/677,249, filed on Jul. 30, 2012, provisional application No. 61/706,546, filed on Sep. 27, 2012.

(51) Int. Cl.
*G06F 7/00* (2006.01)
*G06F 17/30* (2006.01)

(52) U.S. Cl.
CPC .......... *G06F 17/30442* (2013.01); *G06F 17/30* (2013.01)
USPC ............................ 707/754; 707/758; 707/769

(58) Field of Classification Search
CPC ...................... H04L 29/12528; H04L 61/2575
USPC ......................................................... 707/754
See application file for complete search history.

(56) References Cited

U.S. PATENT DOCUMENTS

| | | | |
|---|---|---|---|
| 5,799,320 A | 8/1998 | Klug | |
| 5,848,415 A | 12/1998 | Guck | |
| 5,999,908 A | 12/1999 | Abelow | |
| 6,073,161 A | 6/2000 | DeBoskey et al. | |
| 6,233,600 B1 | 5/2001 | Salas et al. | |

(Continued)

FOREIGN PATENT DOCUMENTS

| | | |
|---|---|---|
| CA | 2724521 | 11/2009 |
| CN | 101997924 A | 3/2011 |

(Continued)

OTHER PUBLICATIONS

"Conceptboard", One-Step Solution for Online Collaboration, retrieved from websites http://conceptboard.com and https://www.youtube.com/user/ConceptboardApp?feature=watch, printed on Jun. 13, 2013, 9 pages.

(Continued)

*Primary Examiner* — Binh V Ho
(74) *Attorney, Agent, or Firm* — Perkins Coie LLP

(57) ABSTRACT

A cloud-based platform (e.g., cloud-based collaboration and/or storage platform/service) is described that permits advanced searches with advanced filtering mechanisms to be performed by administrators or other authorized individuals, across an organization, enterprise, or other select groups of entities in a cloud environment, such as a cloud-based collaborative environment. Various types, categories, metadata, and filters can be specified for use in the advanced search within select folders, users' folders, or across a larger set/group of folders and/or users.

17 Claims, 21 Drawing Sheets

(56) References Cited

U.S. PATENT DOCUMENTS

| | | |
|---|---|---|
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,515,681 B1 | 2/2003 | Knight |
| 6,584,466 B1 | 6/2003 | Serbinis et al. |
| 6,636,872 B1 | 10/2003 | Heath et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,010,752 B2 | 3/2006 | Ly |
| 7,039,806 B1 | 5/2006 | Friedman et al. |
| 7,069,393 B2 | 6/2006 | Miyata et al. |
| 7,133,834 B1 | 11/2006 | Abelow |
| 7,149,787 B1 | 12/2006 | Mutalik et al. |
| 7,152,182 B2 | 12/2006 | Ji et al. |
| 7,155,483 B1 | 12/2006 | Friend et al. |
| 7,222,078 B2 | 5/2007 | Abelow |
| 7,275,244 B1 | 9/2007 | Charles Bell et al. |
| 7,296,025 B2 | 11/2007 | Kung et al. |
| 7,346,778 B1 | 3/2008 | Guiter et al. |
| 7,353,252 B1 | 4/2008 | Yang et al. |
| 7,370,269 B1 | 5/2008 | Prabhu et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,650,367 B2 | 1/2010 | Arruza |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,937,663 B2 | 5/2011 | Parker et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 * | 9/2011 | Ding et al. .................... 707/736 |
| RE42,904 E | 11/2011 | Stephens, Jr. |
| 8,065,739 B1 | 11/2011 | Bruening et al. |
| 8,090,361 B2 | 1/2012 | Hagan |
| 8,117,261 B2 | 2/2012 | Briere et al. |
| 8,140,513 B2 | 3/2012 | Ghods et al. |
| 8,151,183 B2 | 4/2012 | Chen et al. |
| 8,185,830 B2 | 5/2012 | Saha et al. |
| 8,214,747 B1 | 7/2012 | Yankovich et al. |
| 8,230,348 B2 | 7/2012 | Peters et al. |
| 8,347,276 B2 | 1/2013 | Schadow |
| 8,358,701 B2 | 1/2013 | Chou et al. |
| 8,429,540 B1 | 4/2013 | Yankovich et al. |
| 8,464,161 B2 | 6/2013 | Giles et al. |
| 8,549,511 B2 | 10/2013 | Seki et al. |
| 8,607,306 B1 | 12/2013 | Bridge et al. |
| 2001/0027492 A1 | 10/2001 | Gupta |
| 2002/0091738 A1 | 7/2002 | Rohrabaugh et al. |
| 2002/0099772 A1 | 7/2002 | Deshpande et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2004/0021686 A1 | 2/2004 | Barberis |
| 2004/0088647 A1 | 5/2004 | Miller et al. |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0181579 A1 | 9/2004 | Huck et al. |
| 2004/0230624 A1 | 11/2004 | Frolund et al. |
| 2004/0246532 A1 | 12/2004 | Inada |
| 2005/0005276 A1 | 1/2005 | Morgan |
| 2005/0010860 A1 | 1/2005 | Weiss et al. |
| 2005/0022229 A1 | 1/2005 | Gabriel et al. |
| 2005/0050228 A1 | 3/2005 | Perham et al. |
| 2005/0063083 A1 | 3/2005 | Dart et al. |
| 2005/0097225 A1 | 5/2005 | Glatt et al. |
| 2005/0114305 A1 * | 5/2005 | Haynes et al. .................... 707/3 |
| 2005/0114378 A1 | 5/2005 | Elien et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0261933 A1 | 11/2005 | Magnuson |
| 2006/0026502 A1 | 2/2006 | Dutta |
| 2006/0036568 A1 * | 2/2006 | Moore et al. .................... 707/1 |
| 2006/0041603 A1 | 2/2006 | Paterson et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0259524 A1 | 11/2006 | Horton |
| 2006/0265719 A1 | 11/2006 | Astl et al. |
| 2006/0271510 A1 | 11/2006 | Harward et al. |
| 2007/0016680 A1 | 1/2007 | Burd et al. |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 * | 5/2007 | McMullen et al. .................... 709/224 |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130163 A1 | 6/2007 | Perez et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0256065 A1 | 11/2007 | Heishi et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0046828 A1 | 2/2008 | Bibliowicz et al. |
| 2008/0059656 A1 | 3/2008 | Saliba et al. |
| 2008/0077631 A1 | 3/2008 | Petri |
| 2008/0104277 A1 | 5/2008 | Tian |
| 2008/0114720 A1 | 5/2008 | Smith et al. |
| 2008/0133674 A1 | 6/2008 | Knauerhase et al. |

(56) References Cited

U.S. PATENT DOCUMENTS

| | | |
|---|---|---|
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154835 A1 | 6/2008 | Redlich et al. |
| 2008/0182628 A1 | 7/2008 | Lee et al. |
| 2008/0183467 A1 | 7/2008 | Yuan et al. |
| 2008/0194239 A1 | 8/2008 | Hagan |
| 2008/0215883 A1 | 9/2008 | Fok et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0049131 A1 | 2/2009 | Lyle et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0193107 A1 | 7/2009 | Srinivasan et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0271708 A1 | 10/2009 | Peters et al. |
| 2009/0276771 A1 | 11/2009 | Nickolov et al. |
| 2009/0300527 A1 | 12/2009 | Malcolm et al. |
| 2009/0327358 A1 | 12/2009 | Lukiyanov et al. |
| 2009/0327961 A1* | 12/2009 | De Vorchik et al. .......... 715/825 |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0036929 A1 | 2/2010 | Scherpa et al. |
| 2010/0042720 A1 | 2/2010 | Stienhans et al. |
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0131868 A1 | 5/2010 | Chawla et al. |
| 2010/0151431 A1 | 6/2010 | Miller |
| 2010/0162365 A1* | 6/2010 | Del Real ........................... 726/4 |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1 | 9/2010 | Waupotitsch et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0306379 A1 | 12/2010 | Ferris |
| 2010/0322252 A1 | 12/2010 | Suganthi et al. |
| 2010/0325155 A1 | 12/2010 | Skinner et al. |
| 2010/0325655 A1 | 12/2010 | Perez |
| 2010/0332401 A1 | 12/2010 | Prahlad et al. |
| 2010/0333116 A1 | 12/2010 | Prahlad et al. |
| 2011/0001763 A1 | 1/2011 | Murakami |
| 2011/0016409 A1* | 1/2011 | Grosz et al. .................... 715/753 |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0047413 A1 | 2/2011 | McGill et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1* | 3/2011 | Gal et al. ........................ 434/365 |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0119313 A1 | 5/2011 | Sung et al. |
| 2011/0142410 A1 | 6/2011 | Ishii |
| 2011/0145744 A1 | 6/2011 | Haynes et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0238458 A1 | 9/2011 | Purcell et al. |
| 2011/0238621 A1 | 9/2011 | Agrawal |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0258461 A1 | 10/2011 | Bates |
| 2011/0258561 A1 | 10/2011 | Ladouceur et al. |
| 2011/0282710 A1 | 11/2011 | Akkiraju et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |
| 2012/0036370 A1 | 2/2012 | Lim et al. |
| 2012/0064879 A1 | 3/2012 | Panei |
| 2012/0072436 A1* | 3/2012 | Pierre et al. .................... 707/758 |
| 2012/0079095 A1 | 3/2012 | Evans et al. |
| 2012/0110436 A1 | 5/2012 | Adler, III et al. |
| 2012/0117626 A1 | 5/2012 | Yates et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1* | 5/2012 | Quintuna ........................ 709/204 |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0173625 A1 | 7/2012 | Berger |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203908 A1 | 8/2012 | Beaty et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0240061 A1 | 9/2012 | Hillenius et al. |
| 2012/0266203 A1 | 10/2012 | Elhadad et al. |
| 2012/0284638 A1 | 11/2012 | Cutler et al. |
| 2012/0284664 A1 | 11/2012 | Zhao |
| 2012/0291011 A1 | 11/2012 | Quine |

(56) References Cited

U.S. PATENT DOCUMENTS

| | | | |
|---|---|---|---|
| 2012/0309540 A1 | 12/2012 | Holme et al. | |
| 2012/0317239 A1 | 12/2012 | Mulder et al. | |
| 2012/0317487 A1 | 12/2012 | Lieb et al. | |
| 2012/0328259 A1 | 12/2012 | Seibert, Jr. et al. | |
| 2012/0331177 A1 | 12/2012 | Jensen | |
| 2012/0331441 A1 | 12/2012 | Adamson | |
| 2013/0007245 A1 | 1/2013 | Malik et al. | |
| 2013/0013560 A1 | 1/2013 | Goldberg et al. | |
| 2013/0014023 A1 | 1/2013 | Lee et al. | |
| 2013/0042106 A1 | 2/2013 | Persaud et al. | |
| 2013/0055127 A1* | 2/2013 | Saito et al. | 715/769 |
| 2013/0067232 A1 | 3/2013 | Cheung et al. | |
| 2013/0080919 A1 | 3/2013 | Kiang et al. | |
| 2013/0124638 A1 | 5/2013 | Barreto et al. | |
| 2013/0138608 A1 | 5/2013 | Smith | |
| 2013/0159411 A1* | 6/2013 | Bowen | 709/204 |
| 2013/0185347 A1 | 7/2013 | Romano | |
| 2013/0185558 A1 | 7/2013 | Seibert et al. | |
| 2013/0191339 A1 | 7/2013 | Haden et al. | |
| 2013/0198600 A1 | 8/2013 | Lockhart et al. | |
| 2013/0246932 A1 | 9/2013 | Zaveri et al. | |
| 2013/0262862 A1 | 10/2013 | Hartley | |
| 2013/0263289 A1* | 10/2013 | Vijayan et al. | 726/31 |
| 2013/0268480 A1 | 10/2013 | Dorman | |
| 2013/0268491 A1 | 10/2013 | Chung et al. | |
| 2013/0275398 A1* | 10/2013 | Dorman et al. | 707/693 |
| 2013/0275429 A1* | 10/2013 | York et al. | 707/737 |
| 2013/0275509 A1 | 10/2013 | Micucci et al. | |
| 2013/0305039 A1 | 11/2013 | Gauda | |
| 2014/0052939 A1 | 2/2014 | Tseng et al. | |
| 2014/0068589 A1 | 3/2014 | Barak | |

FOREIGN PATENT DOCUMENTS

| | | |
|---|---|---|
| CN | 102264063 A | 11/2011 |
| EP | 0921661 A2 | 6/1999 |
| EP | 1528746 A2 | 5/2005 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2004310272 A | 11/2004 |
| JP | 09-269925 | 10/2007 |
| JP | 2008250944 A | 10/2008 |
| KR | 20020017444 A | 3/2002 |
| KR | 20040028036 A | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0219128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |

OTHER PUBLICATIONS

"How-to Geek, How to Sync Specific Folders With Dropbox," downloaded from the internet http://www.howtogeek.com, Apr. 23, 2013, 5 pages.
"Microsoft Office SharePoint 2007 User Guide " Feb. 16, 2010, pp. 1-48.
"Understanding Metadata," National Information Standards Organization, NISO Press, 2004, 20 pages.
Cisco, "FTP Load Balancing on ACE in Routed Mode Configuration Example," DocWiki, Jun. 2011, 7 pages.
Conner, "Google Apps: The Missing Manual," published by O'Reilly Media, May 27, 2008, 24 pages.
Exam Report for EP13158415.3, Applicant: Box, Inc. Mailed Jun. 4, 2013, 8 pages.
Exam Report for GB1300188.8, Applicant: Box, Inc. Mailed May 31, 2013, 8 pages.
Exam Report for GB1306011.6, Applicant: Box, Inc. Mailed Apr. 18, 2013, 8 pages.
Exam Report for GB1310666.1, Applicant: Box, Inc. Mailed Aug. 30, 2013, 10 pages.
Exam Report for GB1313559.5, Applicant: Box, Inc., Mailed Aug. 22, 2013, 19 pages.
Google Docs, http://web.Archive.org/web/20100413105758/http://en.wikipedia.org/wiki/Google_docs, Apr. 13, 2010, 6 pages.
International Search Report and Written Opinion for PCT/US2008/012973 dated Apr. 30, 2009, pp. 1-11.
International Search Report and Written Opinion for PCT/US2011/039126 mailed on Oct. 6, 2011, pp. 1-13.
International Search Report and Written Opinion for PCT/US2011/041308 Mailed Jul. 2, 2012, pp. 1-16.
International Search Report and Written Opinion for PCT/US2011/047530, Applicant: Box. Inc., Mailed Mar. 22, 2013, pp. 1-10.
International Search Report and Written Opinion for PCT/US2011/056472 mailed on Jun. 22, 2012, pp. 1-12.
International Search Report and Written Opinion for PCT/US2011/057938, Applicant: Box, Inc., Mailed Mar. 29, 2013, 10 pages.
International Search Report and Written Opinion for PCT/US2011/060875 Mailed Oct. 30, 2012, pp. 1-10.
International Search Report and Written Opinion for PCT/US2012/056955, Applicant: Box, Inc., Mailed Mar. 27, 2013, pp. 1-11.
International Search Report and Written Opinion for PCT/US2012/063041, Applicant: Box, Inc., Mailed Mar. 29, 2013, 12 pages.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.
International Search Report and Written Opinion for PCT/US2012/070366, Applicant: Box, Inc., Mailed Apr. 24, 2013, 10 pages.
International Search Report and Written Opinion for PCT/US2013/020267, Applicant: Box, Inc., Mailed May 7, 2013, 10 pages.
International Search Report and Written Opinion for PCT/US2013/023889, Applicant: Box, Inc., Mailed Jun. 24, 2013, 13 pages.
International Search Report and Written Opinion for PCT/US2013/029520, Applicant: Box, Inc., Mailed Jun. 26, 2013, 10 pages.
International Search Report and Written Opinion for PCT/US2013/034662, Applicant: Box, Inc., Mailed May 31, 2013, 10 pages.
International Search Report and Written Opinion for PCT/US2013/035404, Applicant: Box, Inc., Mailed Jun. 26, 2013, 13 pages.
International Search Report and Written Opinion for PCT/US2013/039782, Applicant: Box, Inc., Mailed Aug. 28, 2013, 15 pages.
Internet Forums, http://web.achive.org/web/20100528195550/http://en.wikipedia.org/wiki/Internet_forums, Wikipedia, May 30, 2010, pp. 1-20.
Langfeld L. et al., "Microsoft SharePoint 2003 Unleashed," Chapters 11 and 15, Jun. 2004, pp. 403-404, 557-561, 578-581.
Lars, "35 Very Useful Online Tools for Improving your project Management and Team Collaboration," Apr. 31, 2010, tripwiremagazine.com, pp. 1-32.
Palmer, "Load Balancing FTP Servers," BlogNav, Oct. 2008, 2 pages.
Partial International Search Report for PCT/US2011/041308 dated Feb. 27, 2012, pp. 1-2.
Supplementary European Search Report European Application No. EP 08 85 8563 dated Jun. 20, 2011 pp. 1-5.
Wayback, "Wayback machine," Wayback, Jun. 1, 2011, 1 page.
Wiki, http://web.archive.org/web/20100213004936/http://en.wikipedia.org/wiki/Wiki, Feb. 13, 2010, pp. 1-16.

(56) References Cited

OTHER PUBLICATIONS

Yahoo! Groups, http://web.archive.org/web/20090320101529/http://en.wikipedia.org/wiki/Yahoo!_Groups, Wikipedia, Mar. 20, 2009, pp. 1-6.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
Exam Report for EP13168784.0, Applicant: Box, Inc. Mailed Nov. 21, 2013, 7 pages.
Exam Report for EP13185269.1, Applicant: Box, Inc. Mailed Jan. 28, 7 pages.
Exam Report for GB1309209.3, Applicant: Box, Inc. Mailed Oct. 30, 2013, 11 pages.
Exam Report for GB1311417.8, Applicant: Box, Inc. Mailed Dec. 20, 2013, 5 pages.
Exam Report for GB1312095.1, Applicant: Box, Inc. Mailed Dec. 12, 2013, 7 pages.
Exam Report for GB1312874.9, Applicant: Box, Inc. Mailed Dec. 20, 2013, 11 pages.
Exam Report for GB1314771.5, Applicant: Box, Inc. Mailed Feb. 17, 2014, 7 pages.
Exam Report for GB1316532.9, Applicant: Box, Inc. Mailed Oct. 31, 2013, 10 pages.
Exam Report for GB1316533.7, Applicant: Box, Inc. Mailed Oct. 8, 2013, 9 pages.
Exam Report for GB1316971.9, Applicant: Box, Inc. Mailed Nov. 26, 2013, 10 pages.
Exam Report for GB1317600.3, Applicant: Box, Inc. Mailed Nov. 21, 2013, 8 pages.
Exam Report for GB1318373.6, Applicant: Box, Inc. Mailed Dec. 17, 2013, 4 pages.
Exam Report for GB1320902.8, Applicant: Box, Inc. Mailed Dec. 20, 2013, 4 pages.
Gedymin, "Cloud computing with an emphasis on Google App Engine," Master Final Project, Sep. 2011, 146 pages.
International Search Report and Written Opinion for PCT/US2013/034765, Applicant: Box, Inc., Mailed Jan. 20, 2014, 15 pages.
Patent Court Document of Approved Judgment for GB0602349.3 and GB0623571.7; Mar. 3, 2009, 17 pages.
"Average Conversion Time for a D60 RAW file?" http://www.dpreview.com, Jul. 22, 2002, 4 pages.
"Tulsa TechFest 2012—Agenda," retrieved from the website, http://web.archive.org, Oct. 2, 2012, 2 pages.
Burns, "Developing Secure Mobile Applications for Android," Oct. 2008, Version 1.0, 1-28 pages.
Cohen, "Debating the Definition of Cloud Computing Platforms," retrieved from the internet, http:://forbes.com, Feb. 3, 2014, 7 pages.

Comes, "MediaXchange User's Manual," Version 1.15.15, Feb. 1, 2009, pp. 1-90.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Exam Report for GB1308842.2, Applicant: Box, Inc. Mailed Mar. 10, 2014, 4 pages.
Exam Report for GB1312264.3, Applicant: Box, Inc. Mailed Mar. 24, 2014, 7 pages.
John et al., "Always Sync Support Forums—View topic—Allway sync funny behavior," Allway Sync Support Forum at http://sync-center.com, Mar. 28, 2011, XP055109680, 2 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP 11729851.3, Applicant: Box, Inc. Mailed Feb. 7, 2014, 9 pages.
Search Report for EP13187217.8, Applicant: Box, Inc. Mailed Apr. 15, 2014, 12 pages.
Search Report for EP14151588.2, Applicant: Box, Inc. Mailed Apr. 15, 2014, 12 pages.
Search Report for EP14153783.7, Applicant: Box, Inc. Mailed Mar. 24, 2014, 7 pages.
Sommerer, "Presentable Document Format: Improved On-demand PDF to HTML Conversion," retrieved from the internet, http://research.microsoft.com, 8 pages.
Walker, "PDF.js project meeting notes," retrieved from the internet, http://groups.google.com, May 15, 2014, 1 page.
Partial Search Report for EP131832800, Applicant: Box, Inc. Mailed May 8, 2014, 5 pages.
Partial Search Report for EP141509422, Applicant: Box, Inc. Mailed May 8, 2014, 7 pages.
Tulloch et al., "Windows Vista Resource Kit," Apr. 8, 2007, Microsoft Press, XP055113067, 6 pages.
"Revolving sync conflicts; frequently asked questions," Microsoft Tech Support, Jul. 16, 2012, retrieved from the Internet: http://web.archive.org/web, 2 pages.
Pyle et al., "How to enable Event logging for Offline Files (Client Side Caching) in Windows Vista," Feb. 18, 2009, retrieved from the internet: http://blogs.technet.com, 3 pages.
Duffy, "The Best File-Syncing Services," pcmag.com, retrieved from the internet: http://www.pcmag.com, Sep. 28, 2012, 7 pages.
"Troubleshoot sync problems," Microsoft Tech Support: May 2, 2012, retrieved from the internet, http://web. Archive.org/web, 3 pages.
Exam Report for GB1318792.7, Applicant: Box, Inc. Mailed May 22, 2014, 2 pages.
Exam Report for EP13177108.1, Applicant: Box, Inc. Mailed May 26, 2014, 6 pages.

* cited by examiner

Admin Console — My Account

Browse Users

Filter by user

- Joy
- Kevin Acme
- User 13
- Aaron L
- Arnold G
- Kate
- Menaka
- Anurag
- Erik K
- Katie S
- Aaron V
- Chuckles Tu
- Aaron Dunn
- Brian Tran
- Brandon Savage
- Brandon Kwong
- Bridget McMillan
- Beth Rabenstein
- David Lee
- David Tong
- Dave Maynard
- Chris Lagosh
- Alex Padilla
- Alex Chan Cloud Computing Admin Settings 3 Users selected ▾ | Sprints ▾ | Kind is Everything ▾ | Created Date 4/10/12 to 5/10/12 ▾ ⊠

Created Date 4/10/12 to 5/10/12 ▾ ⊠ | Size is 5 MB to 25 MB ▾ ⊠ | Owned by 3 users ▾ ⊠

Tag is 3 selected ▾ ⊠

| Name | Updated by | Date | Size |
|---|---|---|---|
| Box Terms Glossary.docx older where you upload signed contracts or confirmed email contracts Cloud Computing... Katie S > Box Network | User 1 | May 06, 2012 | 30.8 KB |
| Modern Marketing and CCM.pdf Content Management: The Perfect Prescription High had checked out cloud computing for... Anurag > Cloud Content Management | User 2 | May 06, 2012 | 785.8 KB |
| Box Sync Data Sheet.pdf esktop -- automatically. Get up to speed (and into the cloud) faster Use Box Sync to get... David Lee > Datasheets | User 2 | May 06, 2012 | 427.8 KB |
| General Box Slides.pptx ost Maintenance outsourced to the cloud IT's role is becoming more about strategy than... Brandon Savage > Presentations | User 3 | May 06, 2012 | 3.2 MB |
| Launch Deck.pptx Box Simplifies Cloud Content Security. The simplest way to share and access business... Alex Padilla > Trends and reports | User 1 | May 06, 2012 | 2.3 MB |
| Counterintuitive Collaboration Trends... xECUTIvE SUMMARy Some collaboration trends are clear and very important -- cloud... | User 1 | May 06, 2012 | 160.6 KB |

SYSTEM AND METHOD FOR ADVANCED SEARCH AND FILTERING MECHANISMS FOR ENTERPRISE ADMINISTRATORS IN A CLOUD-BASED ENVIRONMENT

CROSS-REFERENCE TO RELATED APPLICATIONS AND EFFECTIVE FILING DATE ENTITLEMENT

This application claims the benefit of and/or the right of priority to U.S. Provisional Patent Application No. 61/677,249 entitled "ADVANCED SEARCH AND FILTERING MECHANISMS FOR ENTERPRISE ADMINISTRATORS IN A CLOUD-BASED ENVIRONMENT," which was filed on Jul. 30, 2012, and U.S. Provisional Patent Application No. 61/706,546 entitled "ADVANCED SEARCH AND FILTERING MECHANISMS FOR ENTERPRISE ADMINISTRATORS IN A CLOUD-BASED ENVIRONMENT," which was filed on Sep. 27, 2012, the contents of which are incorporated by reference in their entireties herein. This application is therefore entitled to an effective filing date of Jul. 30, 2012.

BACKGROUND

Enterprises store and retain large amounts of data that need to be navigable among multiple corporate users. For data system to be useful, any given corporate user of the enterprise should be able to easily search for items that the user has previously stored based on various filters or a combination thereof.

BRIEF DESCRIPTION OF THE DRAWINGS

Examples of a cloud-based platform (e.g., cloud-based collaboration and/or storage platform/service) that allows searches to be performed by administrators across select groups of entities in an enterprise are illustrated in the figures. The examples and figures are illustrative rather than limiting.

FIG. 4 depicts a screenshot showing an example of a user interface for an administrator of an enterprise performing a search of the contents used by members of the enterprise.

FIG. 5 depicts a screenshot showing an example of a user interface for an administrator of an enterprise entering criteria for a search based on user.

FIG. 7 depicts a screenshot showing an example of a user interface for an administrator of an enterprise entering criteria for a search based on folders.

FIG. 9 depicts a screenshot showing an example of a user interface for an administrator of an enterprise selecting an additional filter for a search.

FIG. 11 depicts a screenshot showing an example of a user interface for an administrator of an enterprise selecting an additional filter for a search from the remaining available filters.

FIG. 12 depicts a screenshot showing an example of a user interface for an administrator of an enterprise selecting an update date range for a search based on file update date.

FIG. 13 depicts a screenshot showing an example of a user interface for an administrator of an enterprise selecting a size range for a search based on file size.

FIG. 14 depicts a screenshot showing an example of a user interface for an administrator of an enterprise selecting an owner for a search based on owner.

FIG. 15 depicts a screenshot showing an example of a user interface for an administrator of an enterprise selecting tags for a search based on tags.

FIG. 16 depicts a screenshot showing an example of a user interface for an administrator of an enterprise where several search filters have been selected.

DETAILED DESCRIPTION

A cloud-based platform (e.g., cloud-based collaboration and/or storage platform/service) is described that permits advanced searches with advanced filtering mechanisms to be performed by administrators or other authorized individuals, across an organization, enterprise, or other select groups of entities in a cloud environment, such as a cloud-based collaborative environment. Various types, categories, metadata, and filters can be specified for use in the advanced search within select folders, users' folders, or across a larger set/group of folders and/or users.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

Figure 1:
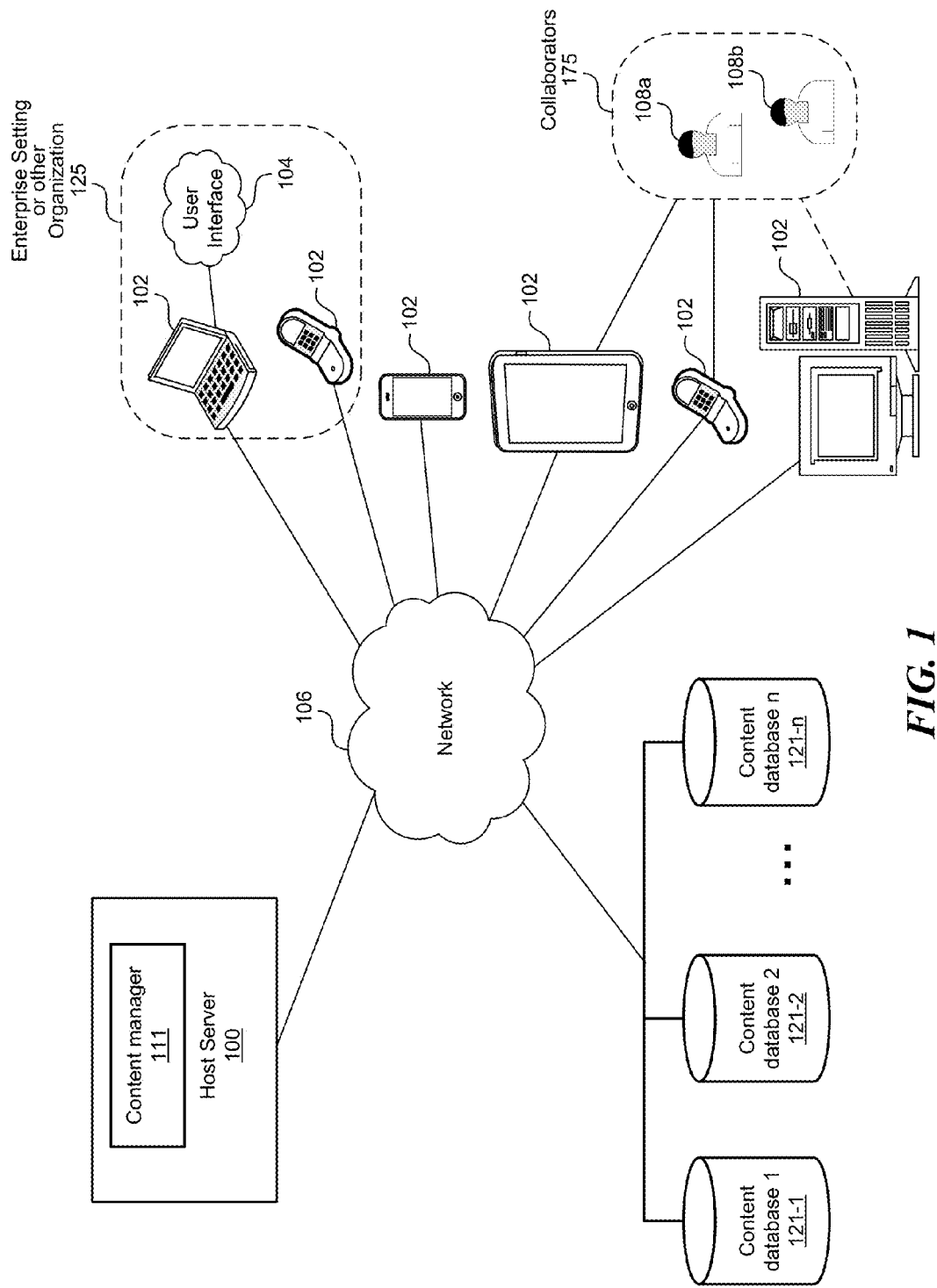
FIG. 1 illustrates an example diagram of a system where a host server supports searches by an administrator across an enterprise in a cloud-based platform (e.g., cloud-based collaboration and/or storage platform/service).

FIG. 1 illustrates a diagram of an example system that has a host server 100 with a content manager 111 that allows an administrator to perform advanced searches across data stored within a cloud-based platform (e.g., cloud-based collaboration and/or storage platform/service) by members of an enterprise or organization.

The client devices 102 can be any system and/or device, and/or any combination of devices/systems that is able to establish a connection, including wired, wireless, cellular connections with another device, a server and/or other systems such as host server 100 via, for example, a web application. Client devices 102 will typically include a display and/or other output functionalities to present information and data exchanged between or among the devices 102 and/or the host server 100.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone (e.g., a BlackBerry device such as BlackBerry Z10/Q10, an iPhone, Nexus 4, etc.), a Treo, a handheld tablet (e.g. an iPad, iPad Mini, a Galaxy Note, Galaxy Note II, Xoom Tablet, Microsoft Surface, Blackberry PlayBook, Nexus 7, 10 etc.), a phablet (e.g., HTC Droid DNA, etc.), a tablet PC, a thin-client, a hand held console, a hand held gaming device or console (e.g., XBOX live, Nintendo DS, Sony PlayStation Portable, etc.), iOS powered watch, Google Glass, a Chromebook and/or any other portable, mobile, hand held devices, etc. running on any platform or any operating system (e.g., Mac-based OS (OS X, iOS, etc.), Windows-based OS (Windows Mobile, Windows 7, Windows 8, etc.), Android, Blackberry OS, Embedded Linux platforms, Palm OS, Symbian platform, Google Chrome OS, and the like. In one embodiment, the client devices 102, and host server 100 are coupled via a network 106. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by various users or collaborators (e.g., collaborators 108) for accessing, through network 106, a cloud-based platform (e.g., cloud-based collaboration and/or storage platform/service) (e.g., hosted by the host server 100). The collaboration environment or platform can have one or more collective settings 125 for an enterprise or an organization to which the users belong, and can provide a user interface 104 for the users to access such platform under the settings 125.

The cloud-based service (e.g, collaboration platform or environment) hosts workspaces with work items that one or more users can access (e.g., view, edit, update, revise, comment, add to discussions, download, preview, tag, or otherwise manipulate, etc.). A work item can generally include any type of digital or electronic content that can be viewed or accessed via an electronic device (e.g., device 102). The digital content can include .PDF files, .doc, slides (e.g., PowerPoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may have different access rights to different pieces of content. Access rights may be specified by a user associated with a workspace and/or a user who created/uploaded a particular piece of content to the workspace, or any other designated user or collaborator.

In general, the collaboration platform allows multiple users or collaborators to access or collaborate on efforts on work items such that each user can see, remotely, edits, revisions, comments, or annotations being made to specific work items through their own user devices. For example, a user can upload a document to a workspace for other users to access (e.g., for viewing, editing, commenting, discussing, signing-off, or otherwise manipulating). The user can login to the online platform and upload the document (or any other type of work item) to an existing workspace or to a new workspace. The document can be shared with existing users or collaborators in a workspace. Each document, work item, file, and folder can only be owned by a single user. However, the owner of the document, work item, file, or folder can transfer ownership to another collaborator.

The content databases 121-1 to 121-$n$ store files and folders uploaded to the cloud-based platform (e.g., cloud-based collaboration and/or storage platform/service) along with metadata for the uploaded files and folders. The uploaded data can be searched by, for example, the metadata, such as tags, users, owners, and creation or update date.

In some embodiments, client devices 102 communicate with the host server 100 over network 106. In general, network 106, over which the client devices 102 and the host server 100 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but not limited to, the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In some embodiments, communications to and from the client devices 102 can be achieved by, an open network, such as the Internet, or a private network, such as an intranet and/or the extranet. In some embodiments, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

Figure 2:
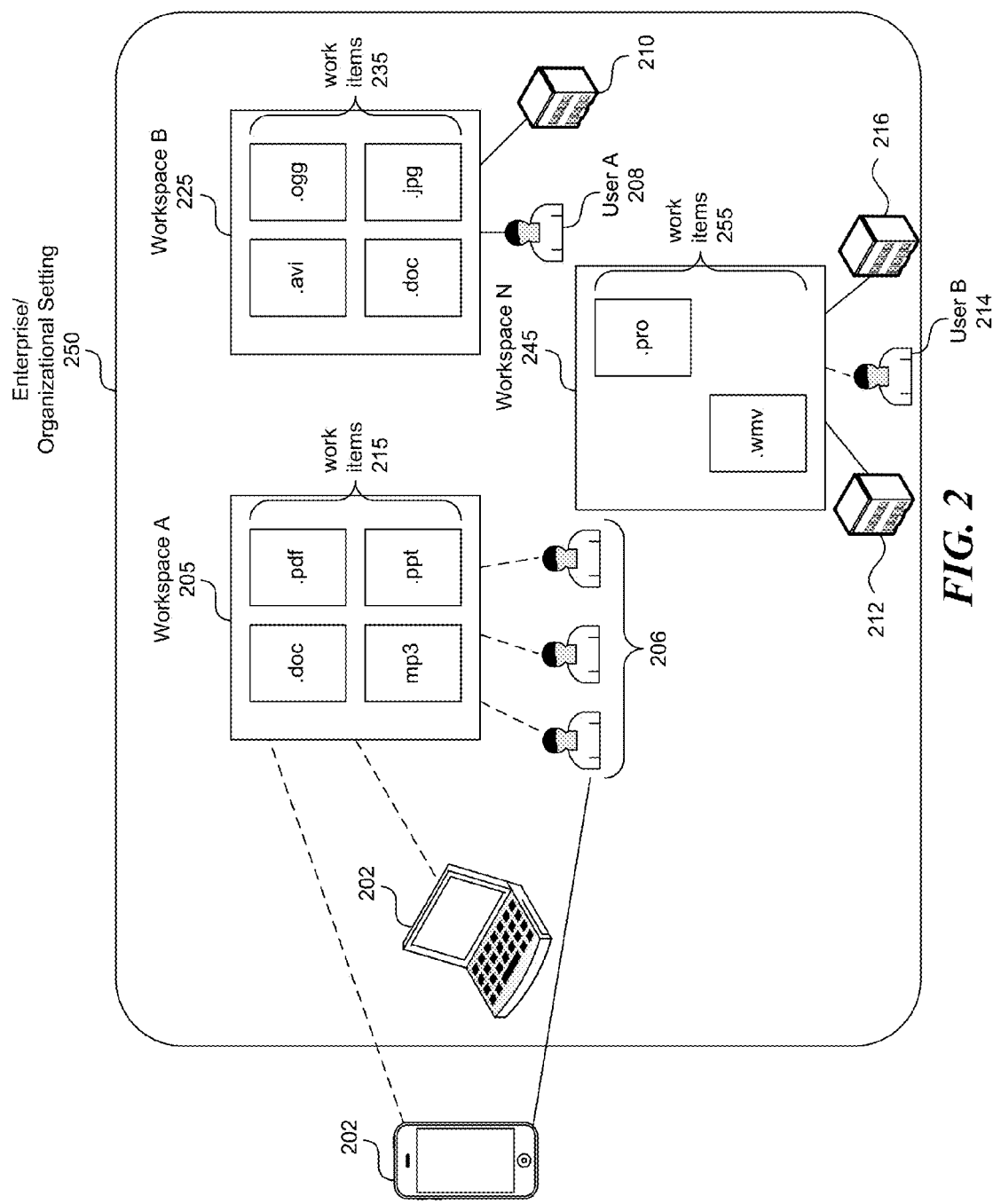
FIG. 2 depicts an example diagram of a web-based or cloud-based platform (e.g., cloud-based collaboration and/or storage platform/service) deployed in an enterprise or other organizational setting for organizing work items and workspaces.

FIG. 2 depicts an example diagram of a web-based or cloud-based platform (e.g., cloud-based collaboration and/or storage platform/service) deployed in an enterprise or other organizational setting 250 for organizing workspaces 205, 225, 245 and work items 215, 235, 255, where the work items and workspaces are hosted on content databases 1, 2, . . . n 121-1, 121-2, . . . 121-n.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associated work items. For example, workspace A 205 may be associated with work items 215, workspace B 225 can be associated with work items 235, and workspace N 245 can be associated with work items 255. The work items 215, 235, and 255 may be unique to each workspace but need not be. For example, a particular word document can be associated with only one workspace (e.g., workspace A 205) or it may be associated with multiple workspaces (e.g., workspace A 205 and workspace B 225, etc.).

In general, each workspace has a set of users or collaborators associated with it. For example, workspace A 205 is associated with multiple users or collaborators 206. In some instances, workspaces deployed in an enterprise may be department specific. For example, workspace B may be associated with department 210 and some users shown as example user A 208, and workspace N 245 can be associated with departments 212 and 216 and users shown as example user B 214.

Figure 3:
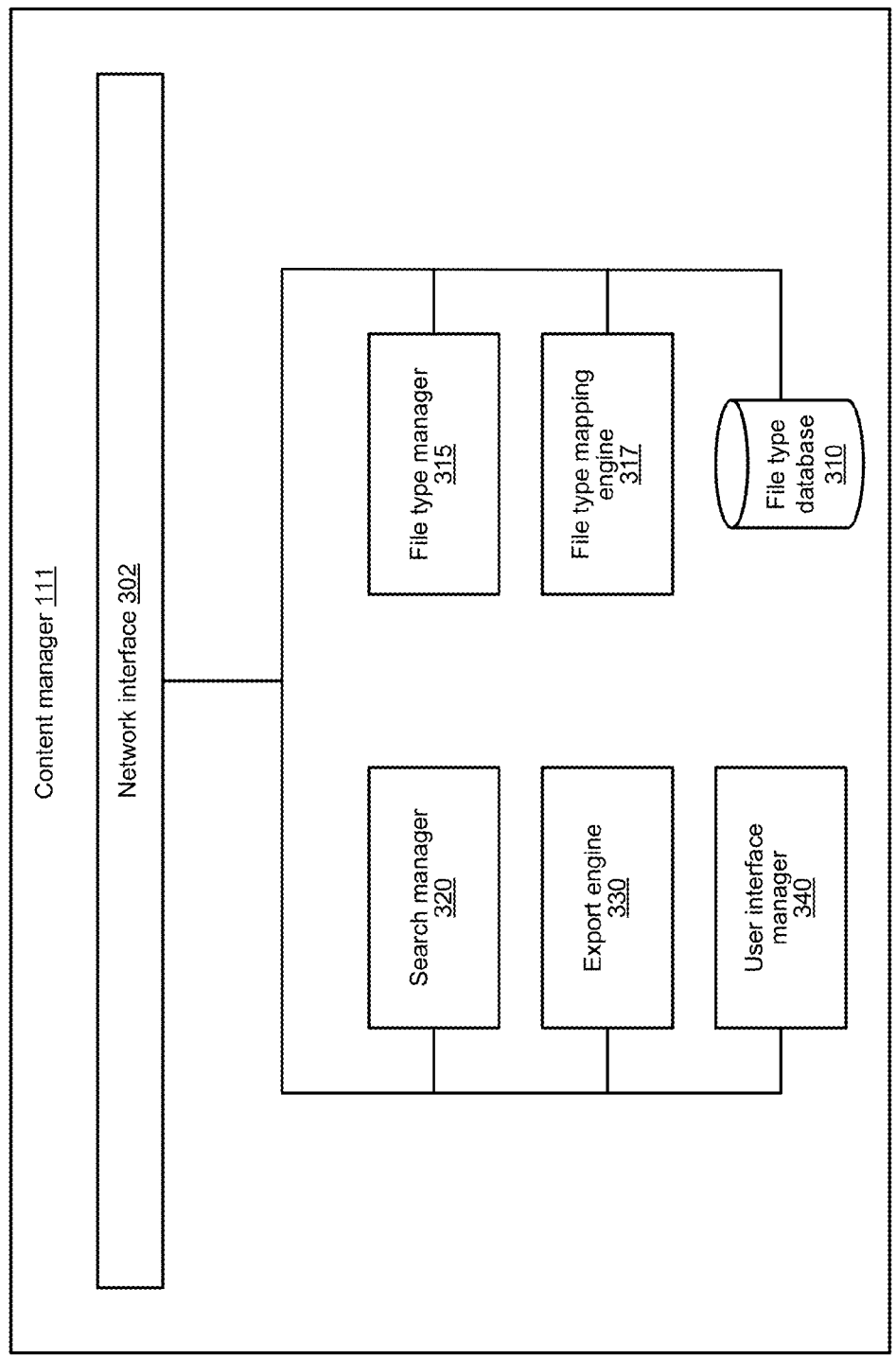
FIG. 3 depicts a block diagram illustrating an example of components in the content manager of a cloud-based platform (e.g., cloud-based collaboration and/or storage platform/service).

FIG. 3 depicts a block diagram illustrating an example of components in the content manager 111 of the host server 100 of a cloud-based platform (e.g., cloud-based collaboration and/or storage platform/service).

The host server 100 of the cloud-based platform (e.g., cloud-based collaboration and/or storage platform/service) can generally be a cloud-based service. The content manager 111 of the host server 100 can include, for example, a network interface 302, a search manager 320, an export engine 330, a user interface manager 340, a file type manager 315, a file type mapping engine 317, and/or a file type database 310. Additional or fewer components/modules/engines can be included in the host server 100, the content manager 111, and each illustrated component.

The network interface 302 can be a networking module that enables the content manager 111 to mediate data in a network with an entity that is external to the content manager 111, through any known and/or convenient communications protocol supported by the content manager 111 and the external entity. The network interface 302 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, bridge router, a hub, a digital media receiver, and/or a repeater.

As used herein, a "module," "manager," or an "engine" includes a general purpose, dedicated or shared processor and, typically, firmware or software modules that are executed by the processor. Depending upon implementation-specific or other considerations, the module or engine can be centralized or its functionality distributed. The module or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

Some embodiments of the content manager 111 include the search manager 320 which can receive requests from an administrator of an enterprise account for a search based on particular search criteria across all accounts associated with the enterprise. The search manager 320 permits an administrator to access content across all users or select groups of users or other entities in the administrator's enterprise. Non-limiting examples of search filters that can be selected by the administrator for applying to a search are shown in Table 1 and include users, folders, file kind, creation date, update date, size, owner, and tag. One or more of these filters can be selected by an administrator to be applied by the search manager 320 in a search of the enterprise's content stored in the content databases 1-n 121-1-121-n.

TABLE 1

| Field | Operations | N-gram? | Shortcut(s) |
| --- | --- | --- | --- |
| Name | Contains | Yes | Name:[term] Name contains term |
| Content | Contains | Yes | Content:[term] Content contains term |

TABLE 1-continued

| Field | Operations | N-gram? | Shortcut(s) |
|---|---|---|---|
| Description | Contains | No | Description:[term] Description contains term |
| Comments | Contains | No | Comment:[term] A Comment contains term |
| Created | Before/Between/After | N/A | Created:[date] Created on date<br>Created>[date] Created after date<br>Created<[date] Created before date |
| Updated | Before/Between/After | N/A | Updated:[date] Updated on date<br>Updated>[date] Updated after date<br>Updated<[date] Updated before date |
| — | — | — | Date:[date] Created or Updated on date<br>Date>[date] Created or Updated after date<br>Date<[date] Created or Updated before date |
| Owner | In | N/A | Owner:[term] Folder owner is term |
| File size | Greater than/Less than/Equal/Between | N/A | Size:[number+unit] Size is number<br>Size>[number+unit] Size is greater than number<br>Size<[number+unit] Size is less than number<br>If no unit entered, default to MB |
| File type | In | No | Type:[term] Type is term<br>Use file extension only |
| Folders | In | No | [Folders] Limits search to folders only |
| Files | In | No | [Files] Limits search for files only |
| Tags | In | No | Tag:[term] A Tag contains term |

Figure 4:
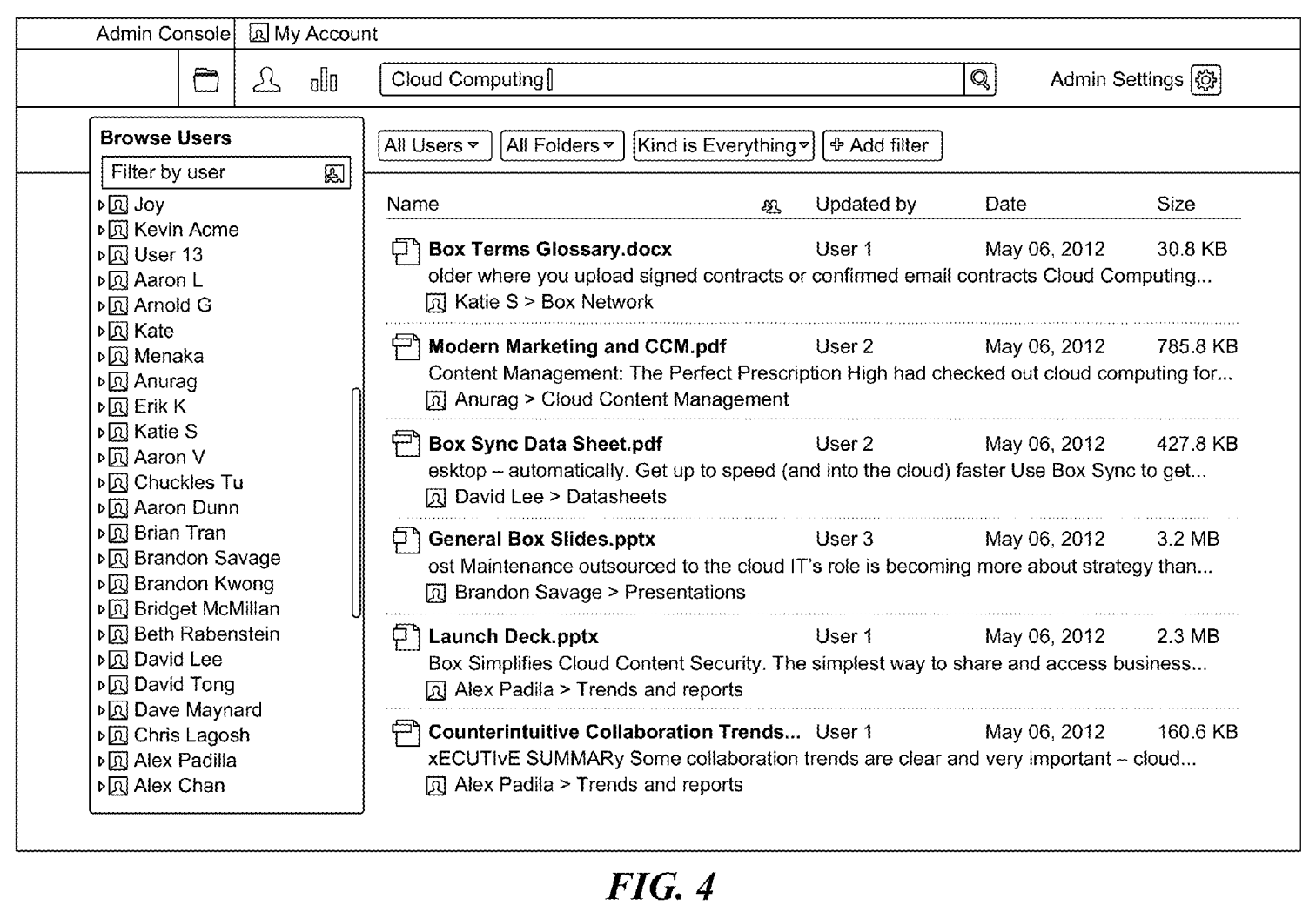

Some embodiments of the content manager 111 include the user interface manager 340 which can display or cause to be displayed the various filters and filter options that are available to an administrator of an enterprise and the administrator's filter selections. For example, FIG. 4 depicts a screenshot showing an example of a user interface for an administrator of an enterprise performing a search of the contents used by members of the enterprise. General categories of filters include users, folders, and kind. Additional filters can also be selected in addition or instead of the general categories of filters, as discussed below.

Figure 5:
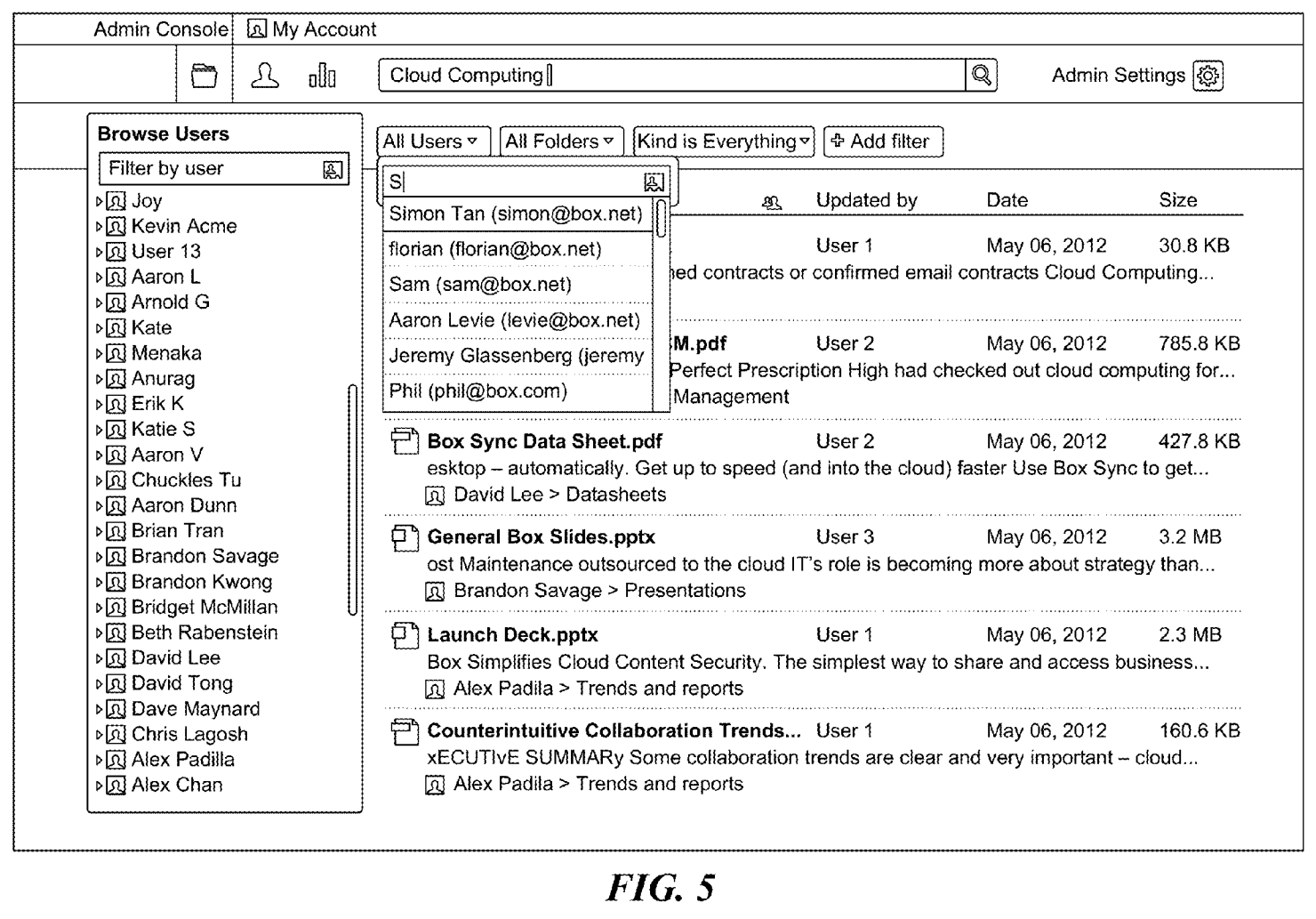
Figure 6:
FIG. 6 depicts a screenshot showing an example of a user interface for an administrator of an enterprise where three users have been selected for a user-based search.

On the left-side of FIG. 4, the user interface manager 340 can provide a list of users associated with the enterprise managed by the administrator. The administrator and select one or more of the enterprise users to filter a search. FIG. 5 depicts a screenshot showing an example of a user interface for an administrator of an enterprise entering criteria for a search based on user, where the administrator has entered the beginning letter, s, in the user filter selection box. FIG. 6 depicts a screenshot showing an example of a user interface for an administrator of an enterprise where three users have been selected for a user-based search and are shown as the selected search filters.

Figure 7:
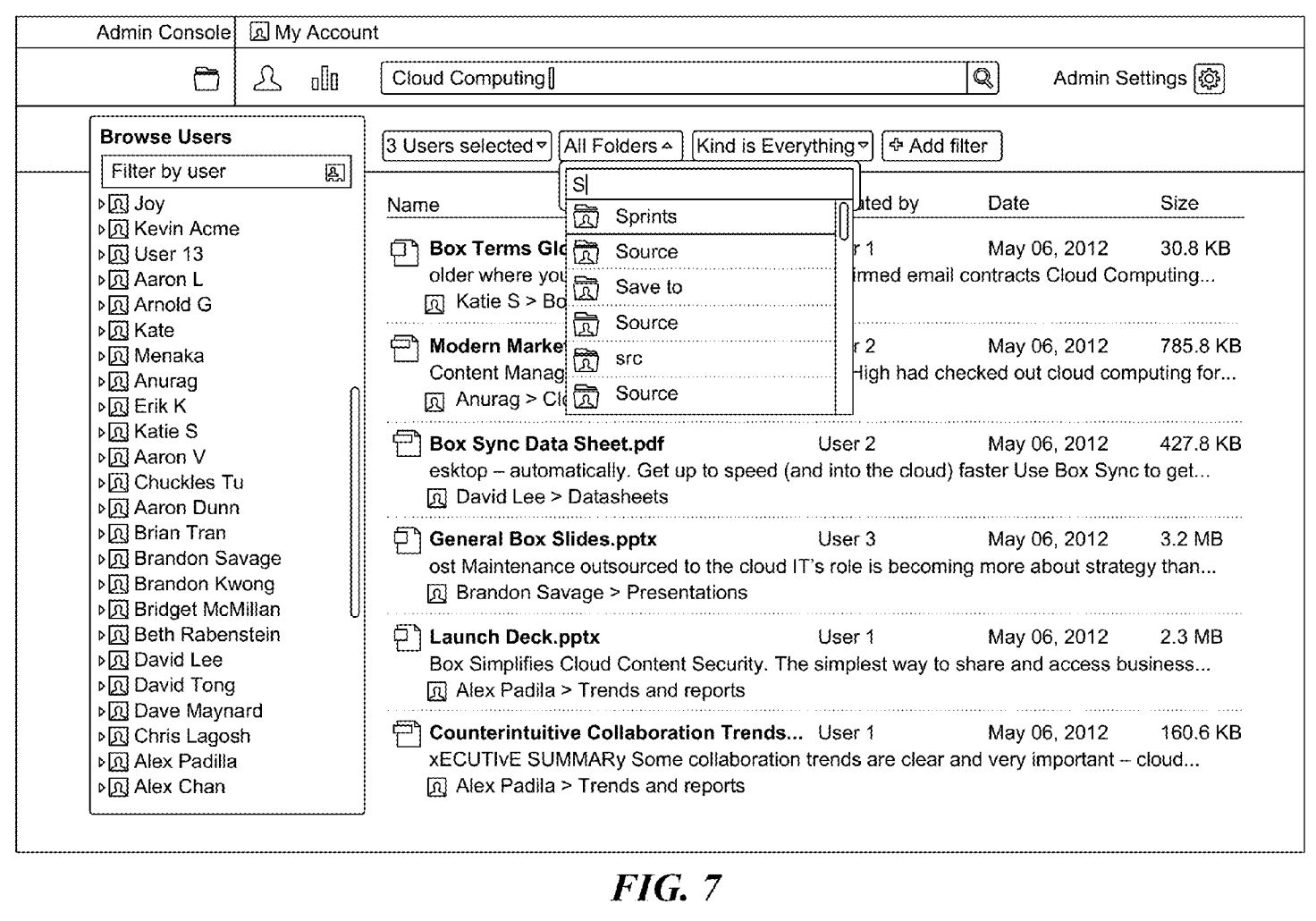

Searching can be performed within one or more selected folders. FIG. 7 depicts a screenshot showing an example of a user interface for an administrator of an enterprise entering criteria for a search based on folders.

Figure 8:
FIG. 8 depicts a screenshot showing an example of a user interface for an administrator of an enterprise selecting criteria for a search based on kind.

Searching can be performed based on a specific kind. Non-limiting examples of kinds include everything, folder, description, comment, file content, file, Word document, drawing, image, PDF, presentation, spreadsheet, music, and video. FIG. 8 depicts a screenshot showing an example of a user interface for an administrator of an enterprise selecting criteria from a menu for a search based on kind.

Figure 9:
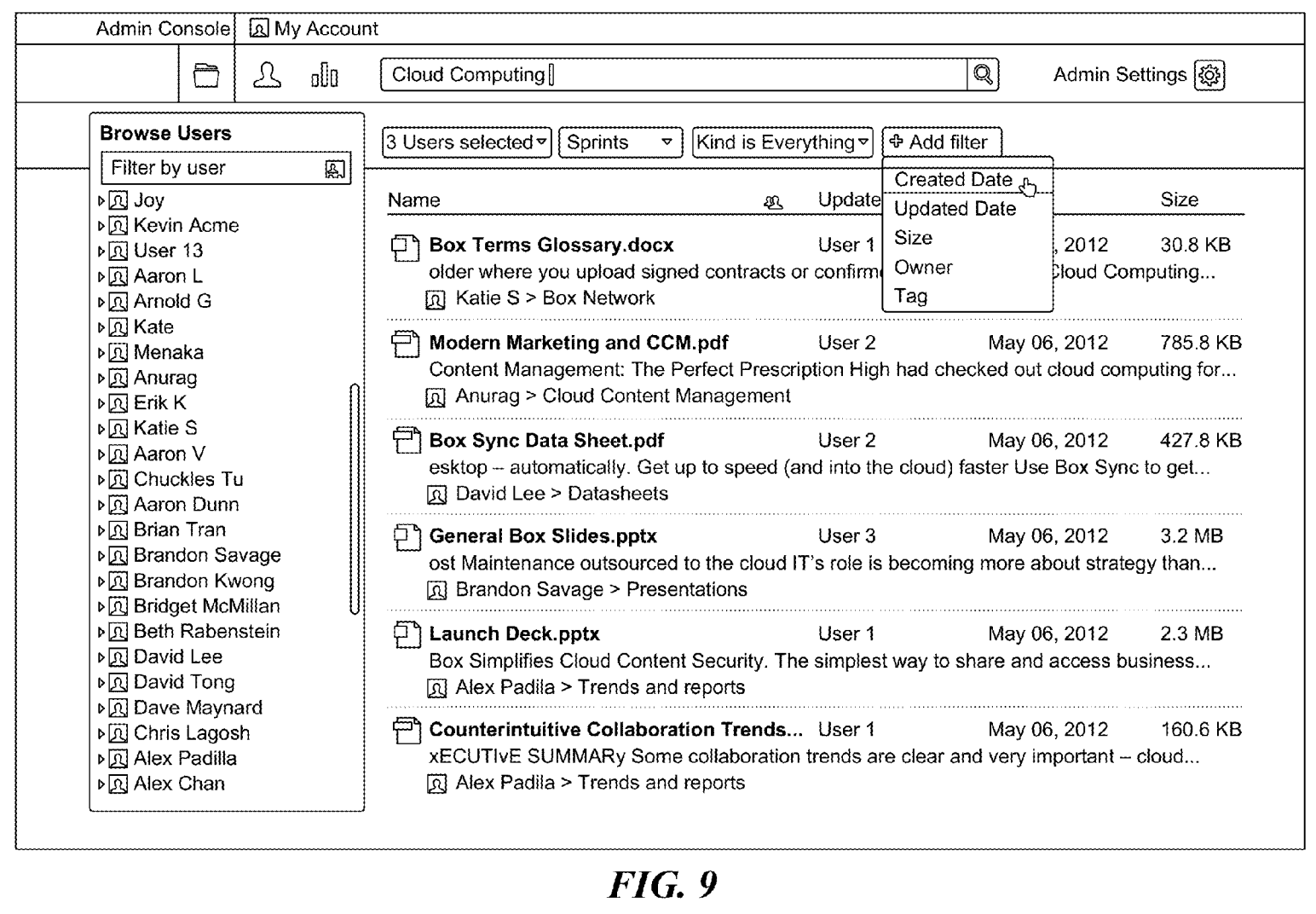

Additional filters can be added or used instead of the ones described above. Non-limiting examples of additional filters include, creation date of a file, update date of a file, size of a file, owner of a file, and a tag for a file. FIG. 9 depicts a screenshot showing an example of a user interface for an administrator of an enterprise selecting an additional filter for a search.

Figure 10:
FIG. 10 depicts a screenshot showing an example of a user interface for an administrator of an enterprise selecting a creation date range for a search based on file creation date.

If the administrator selects creation date of a file as an additional filter, the user interface manager 340 will prompt the administrator to provide a beginning date and an end date for the range of creation dates to be searched. Alternatively, the administrator can choose to enter just a beginning date to search for all files created after the entered data or just an end date to search for all files created before the entered date. FIG. 10 depicts a screenshot showing an example of a user interface for an administrator of an enterprise selecting a creation date range for a search based on file creation date.

Figure 11:
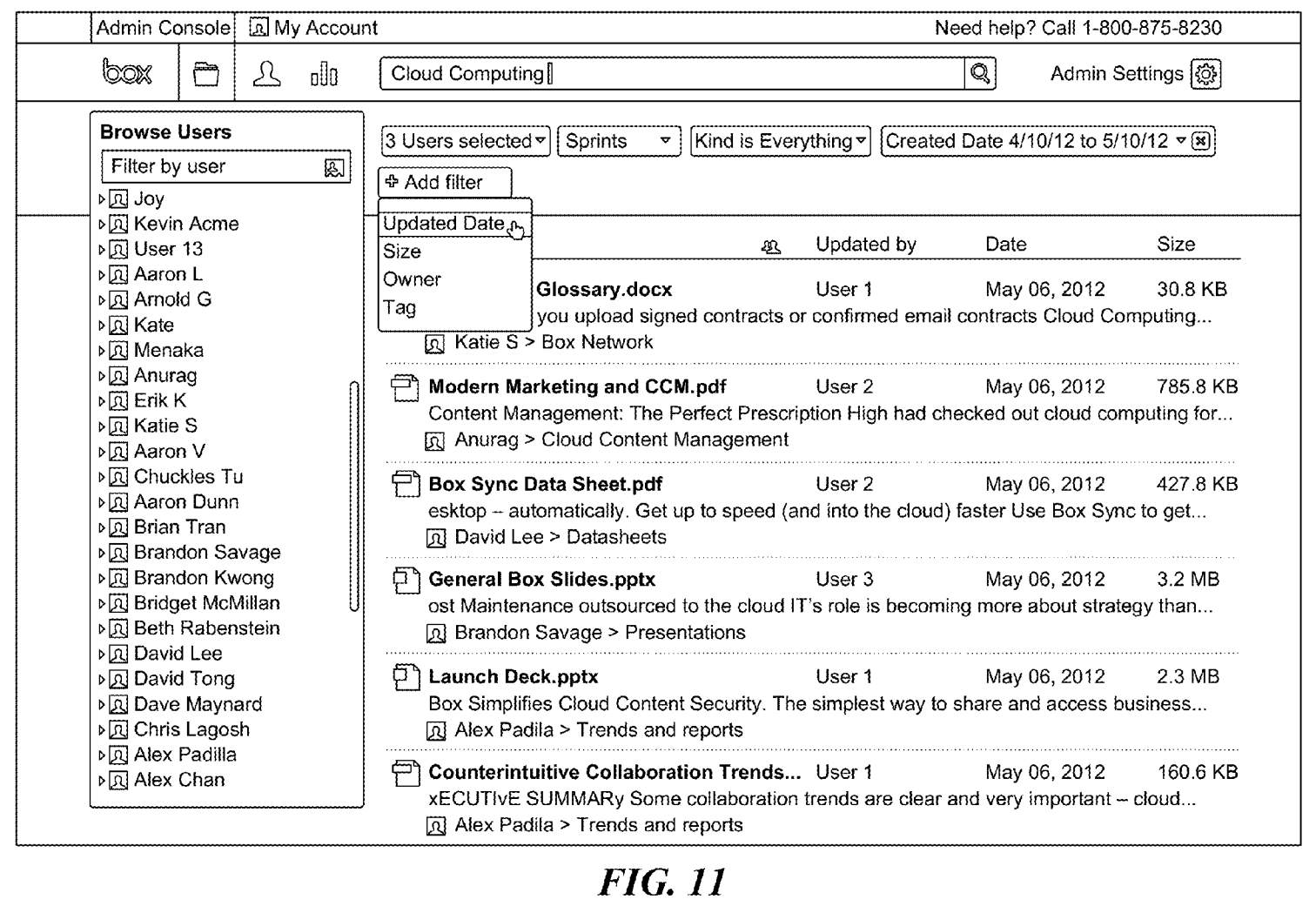

Once a particular additional filter has been selected, for example, creation date, the menu for available additional filters will include only additional filters that have not previously been selected. FIG. 11 depicts a screenshot showing an example of a user interface for an administrator of an enterprise selecting an additional filter for a search from the remaining available filters. In this example, creation date is no longer available as a filter selection because it has already been selected.

Figure 12:
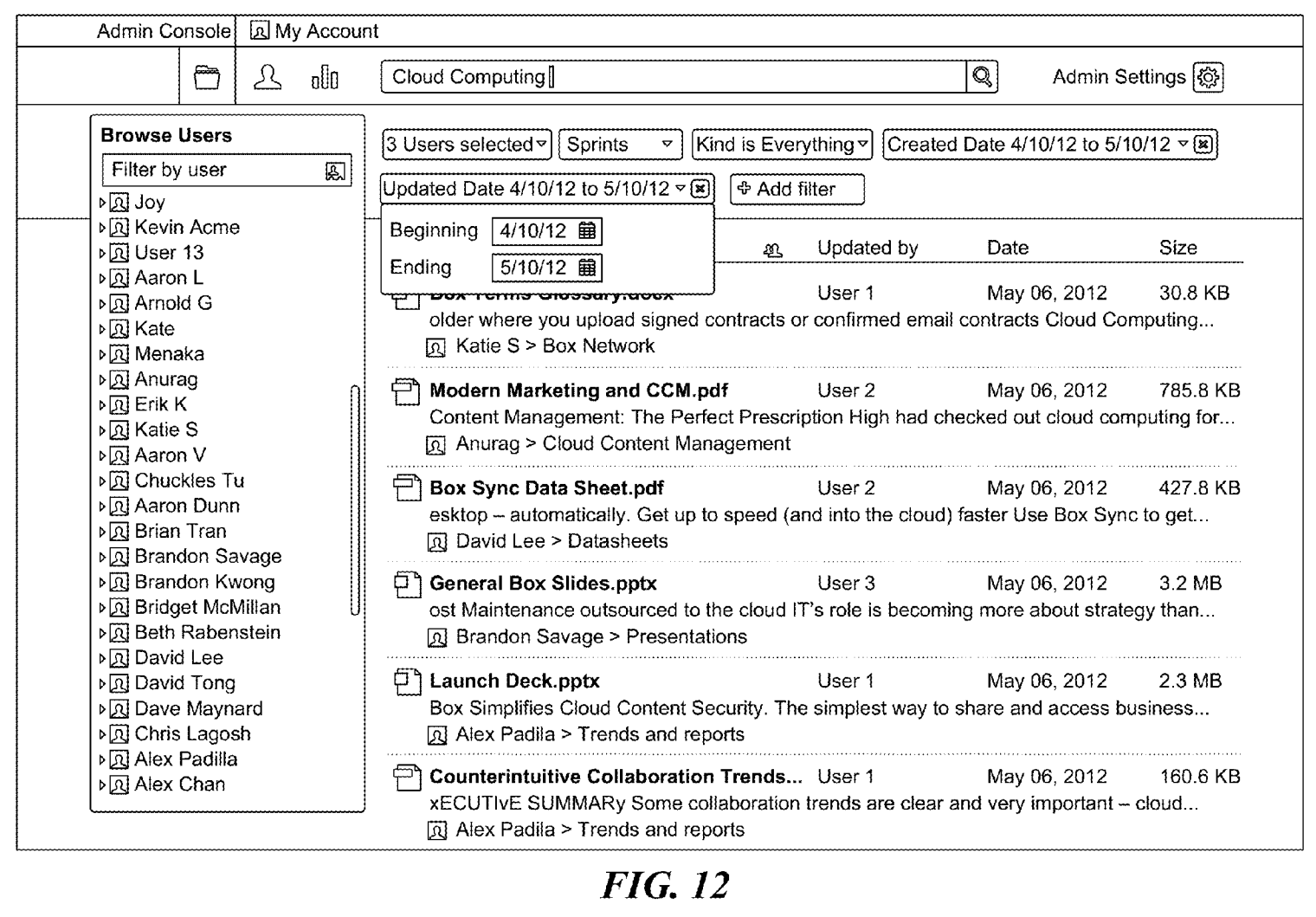

If the administrator selects update date as a search filter, the user interface manager 340 will prompt the administrator for a beginning date and an end date for the range of update dates to be searched. Alternatively, the administrator can choose to enter just a beginning date to search for all files updated after the entered data or just an end date to search for all files updated before the entered date. FIG. 12 depicts a screenshot showing an example of a user interface for an administrator of an enterprise selecting an update date range for a search based on file update date.

Figure 13:
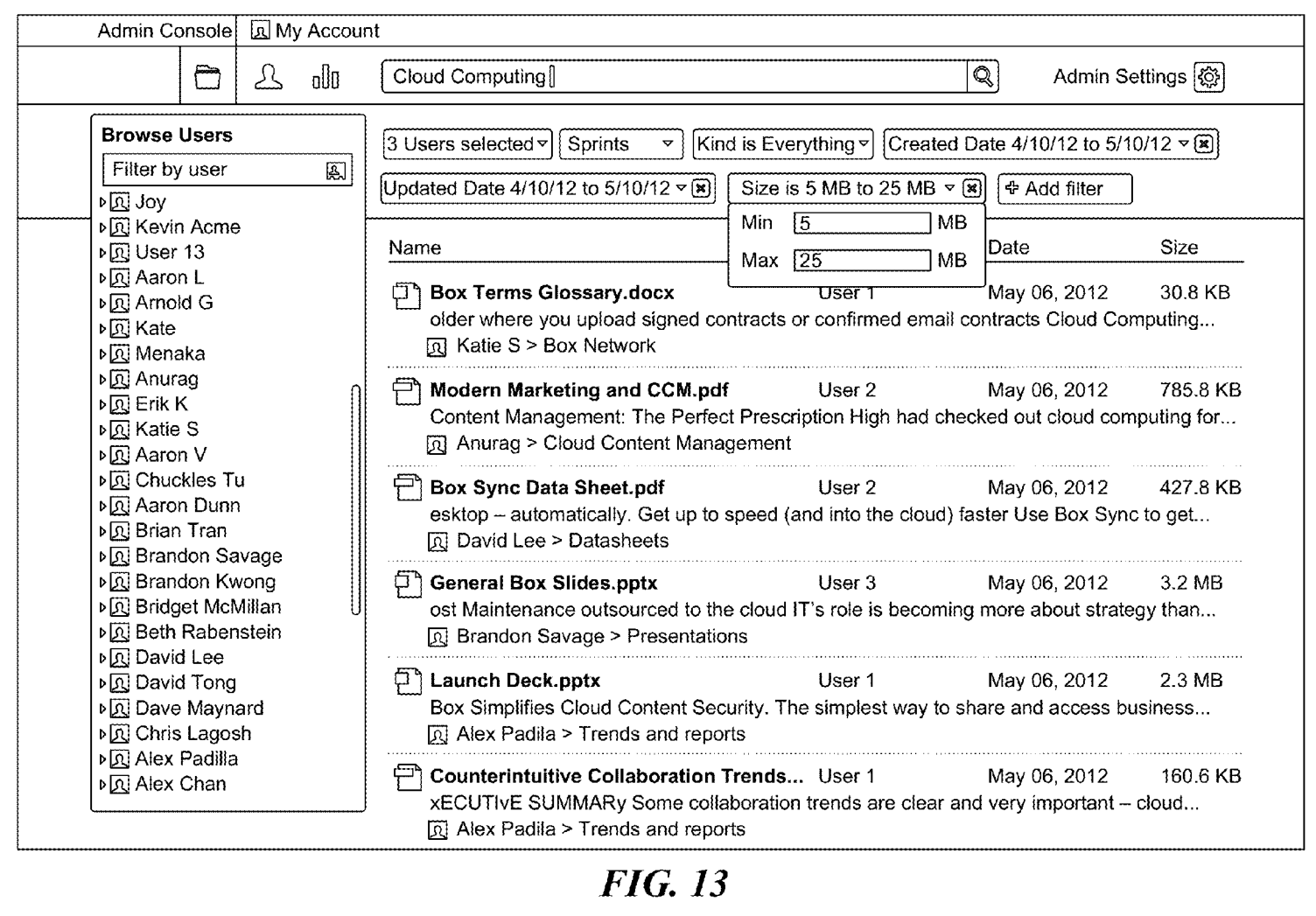

If the administrator selects file size as a search filter, the user interface manager 340 will prompt the administrator for a minimum file size and a maximum file size for the range of file sizes to be searched. Alternatively, the administrator can choose to enter just a minimum file size to search for all files greater than the entered size or just a maximum file size to search for all files less than the entered size. FIG. 13 depicts a screenshot showing an example of a user interface for an administrator of an enterprise selecting a size range for a search based on file size.

Figure 14:
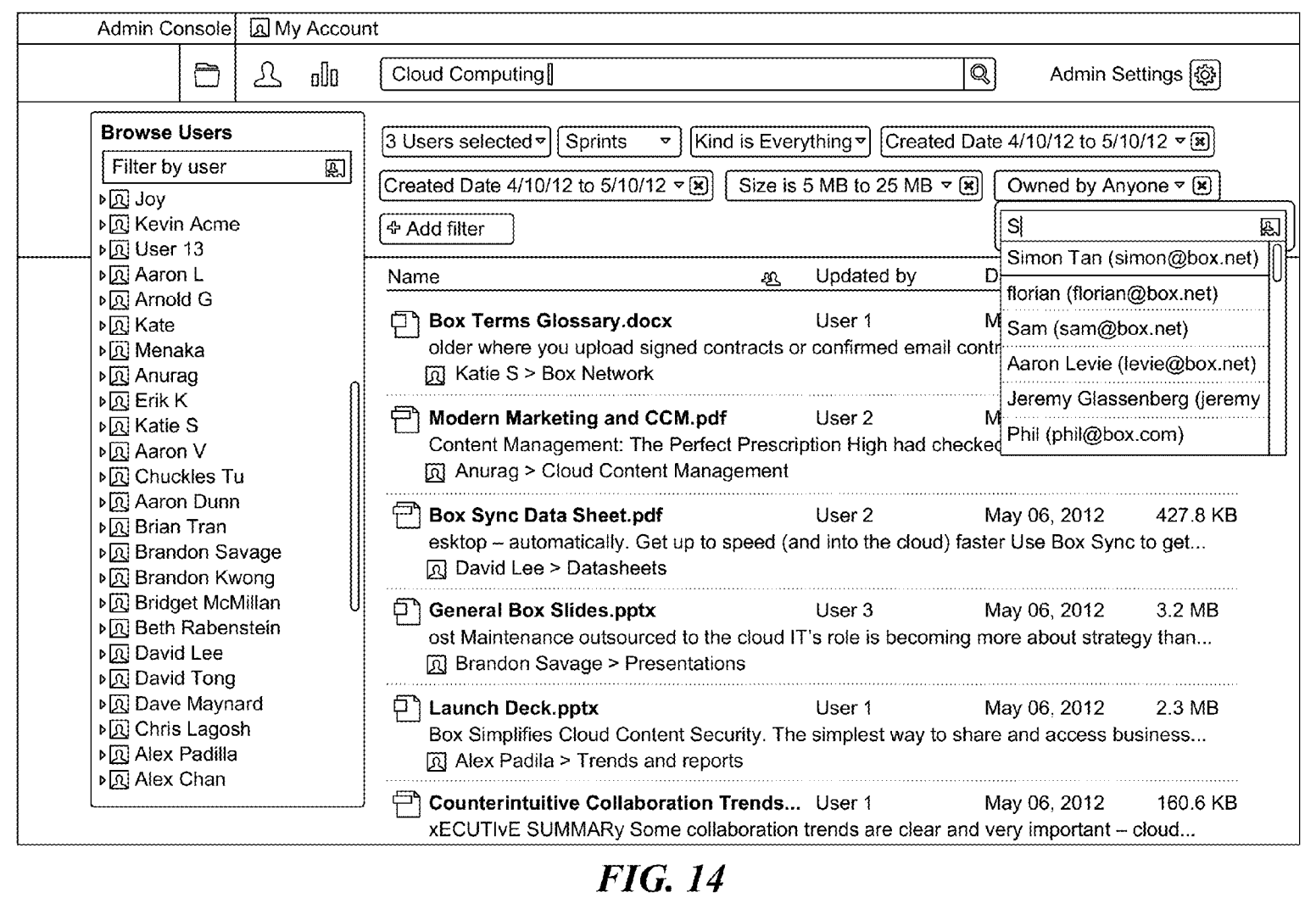

If the administrator selects file owner as a search filter, the user interface manager 340 will prompt the administrator for the owner name to be searched. FIG. 14 depicts a screenshot showing an example of a user interface for an administrator of an enterprise selecting an owner for a search based on owner. A file owner can be identified either by a username or email address.

Figure 15:
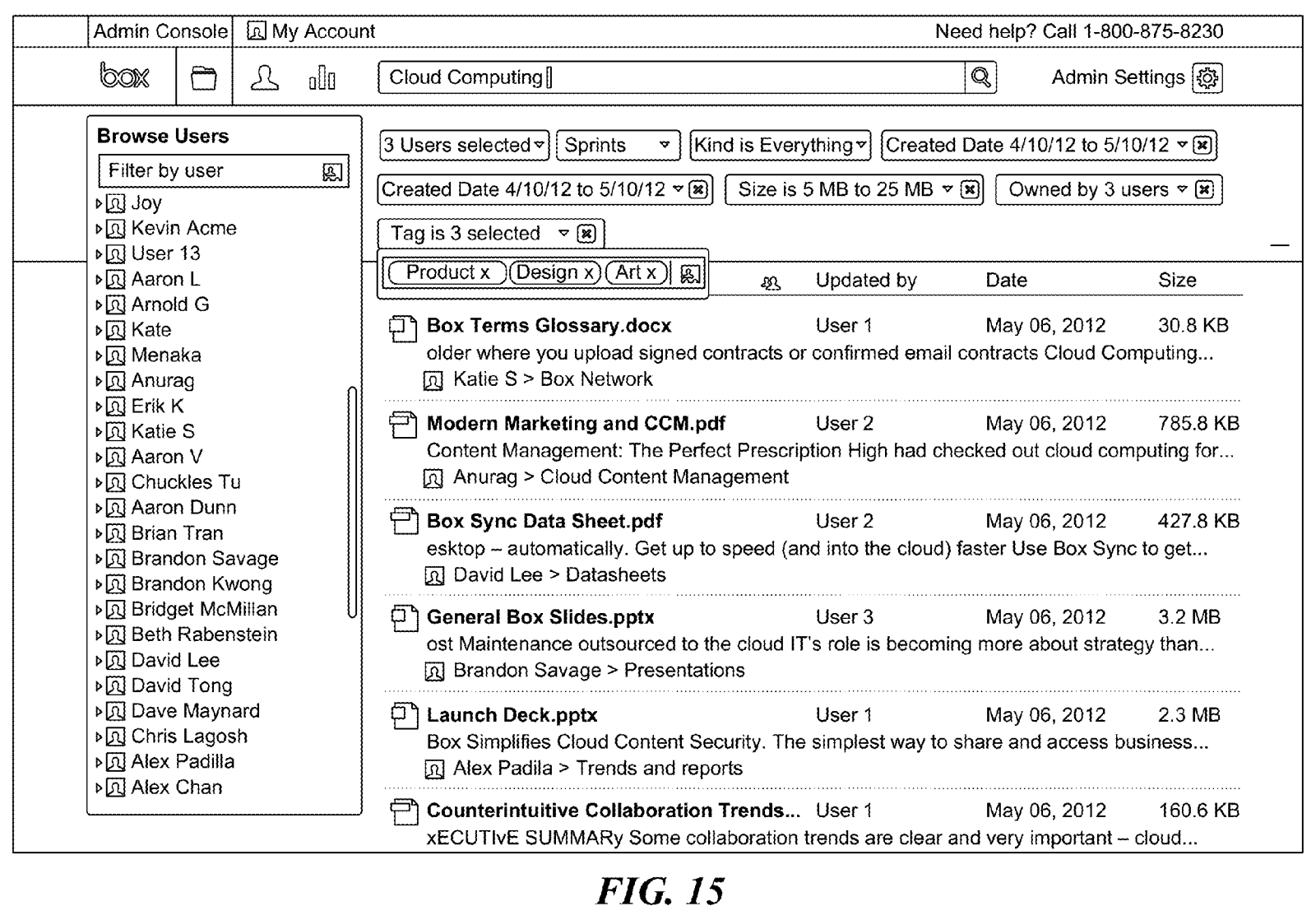

If the administrator selects tags as a search filter, the user interface manager 340 will prompt the administrator for the tags to be searched. FIG. 15 depicts a screenshot showing an example of a user interface for an administrator of an enterprise selecting tags for a search based on tags, where three tags have been selected, product, design, and art.

In some embodiments, the additional filter can allow the administrator to select an additional file type or enter a particular file extension.

If the administrator has selected several search filters to be applied, the user interface manager 340 can display or cause to be displayed the selections simultaneously. FIG. 16 depicts a screenshot showing an example of a user interface for an administrator of an enterprise where several search filters have been selected.

The administrator can also enter a search term, as shown near the top of FIG. 16 by the user interface manager 340, and click on the search button. Then the search manager 320 performs the search with the selected filters. The user interface manager 340 can also display cause to be displayed the results of a search requested by the administrator.

Some embodiments of the content manager 111 include the export engine 330 which can export search results upon request, for example, via downloading by the administrator. The export engine 330 can place the search results in a requested format, for example, in an excel spreadsheet or as comma separated values (CSV), prior to exporting. Additionally, the export engine 330 can export the search results in its entirety or further allow the administrator to filter the results prior to exporting.

Some embodiments of the content manager 111 include the file type mapping engine 317 which can receive a specified mapping between a specific file type and a specific kind and store the received mapping in a file type database 310. For example, files that have any of the following extensions can be mapped to the kind 'audio': aac, aiff, flac, m4a, mp3, mp4, way, and wma; files that have any of the following extensions can be mapped to the kind 'document': doc, docx, fodt, gdoc, odt, pages, rtf, txt, webdoc; files that have any of the following extensions can be mapped to the kind 'image': bmp, gif, jpeg, png, and tiff; files that have any of the following extensions can be mapped to the kind 'presentation': fodp key, keynote, odp, pez, ppt, and pptx; files that have any of the following extensions can be mapped to the kind 'spreadsheet': csv, fods, gsheet, numbers, ods, tsv, xls, and xlsx; files that have any of the following extensions can be mapped to the kind 'video': fla, fly, m4v, mov, mpeg, mpg, and swf; and files that have the file extension pdf can be mapped to the kind 'pdf'. These file extensions are just non-limiting examples. Other file extensions may also be mapped to one of these kinds or to a different kind, and the file extensions listed above may be mapped to other kinds.

As shown in FIG. 3, the file type database 310 is part of the content manager 111. However, in some embodiments, the file type database 310 can be external to the content manager 111. In some embodiments, the file type database 310 is accessed via the network 106 by the content manager 111.

Some embodiments of the content manager 111 include the file type manager 315 which can determine the file extension of uploaded files, and look up in the file type database 310 the corresponding kind for that particular file extension. Then the file type manager 315 stores the determined kind as metadata for the file. Subsequent searches for files that have the determined kind will yield the file in the search results obtained by the search manager 320.

Figure 17A:
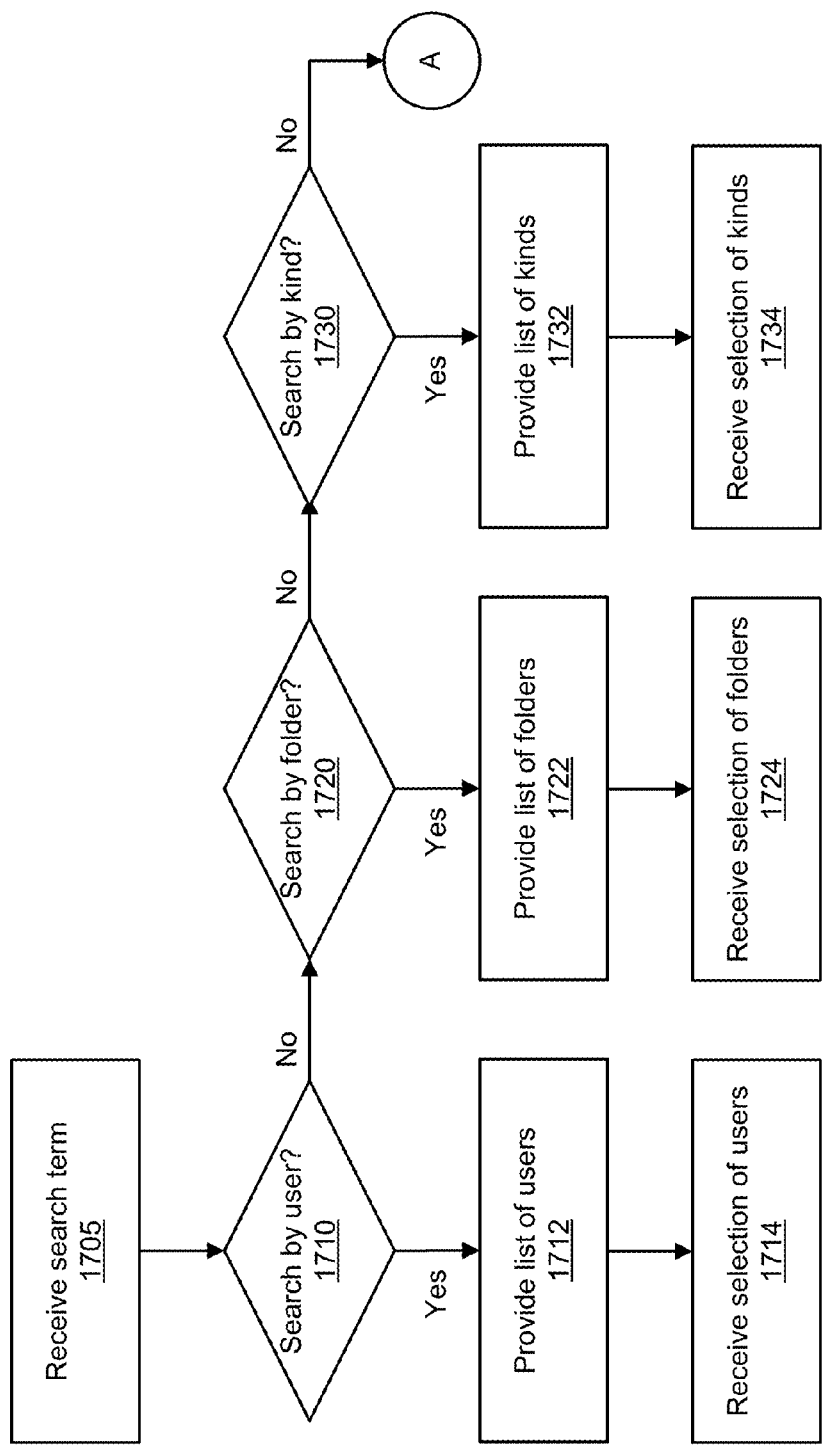
FIGS. 17A-17C depict a flow chart illustrating an example process of searching by an administrator across an enterprise in a cloud-based platform (e.g., cloud-based collaboration and/or storage platform/service).
Figure 17B:
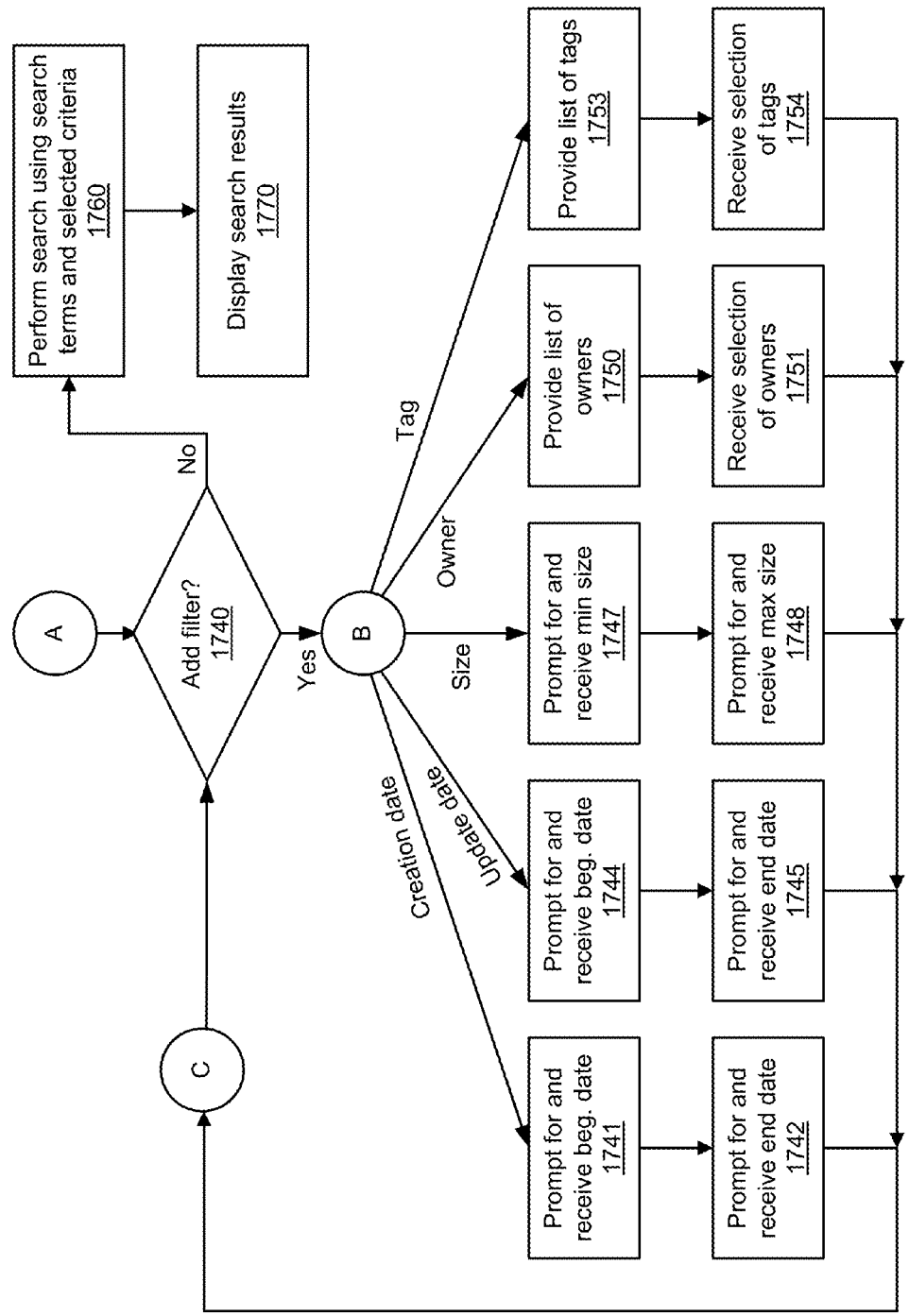
Figure 17C:
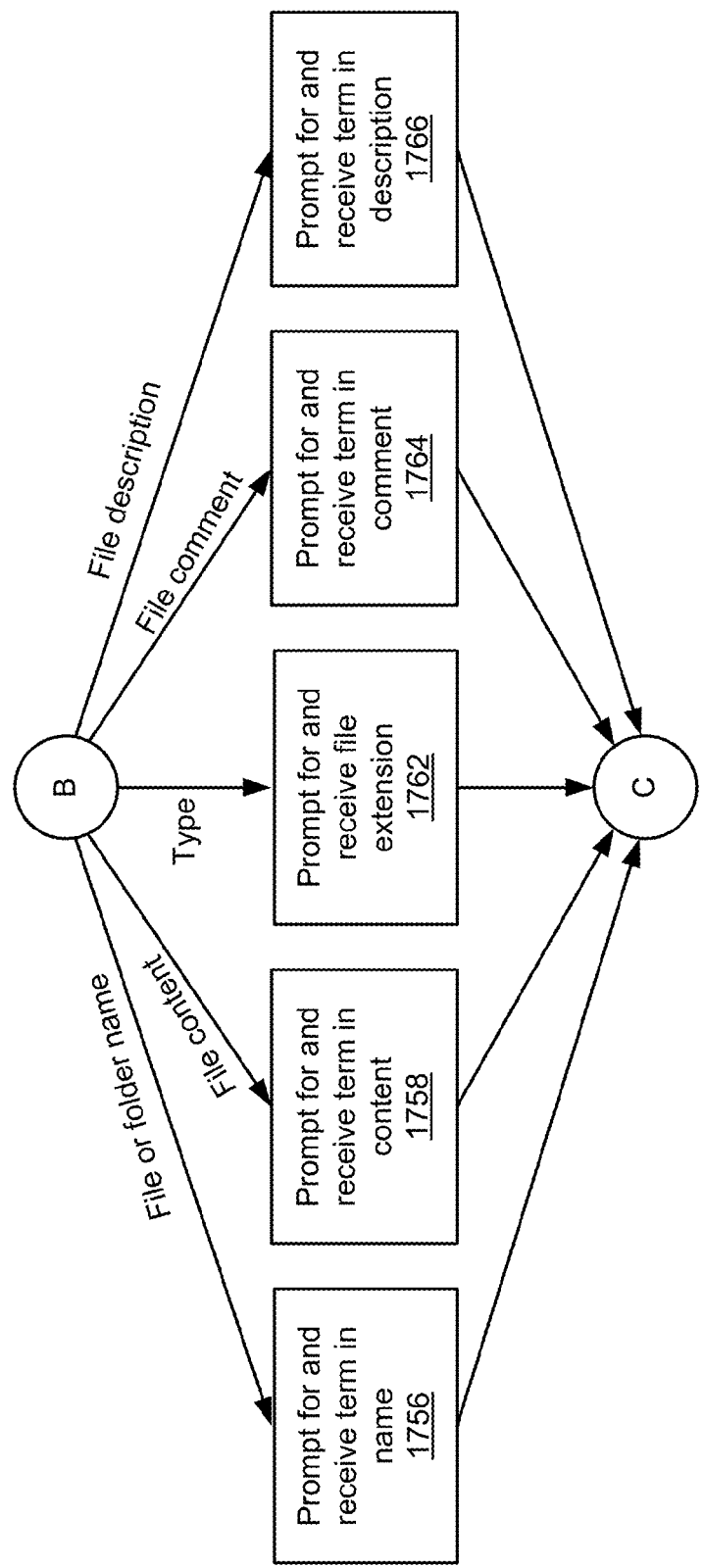

FIGS. 17A-17C depict a flow chart illustrating an example process of searching by an administrator across an enterprise in a cloud-based platform (e.g., cloud-based collaboration and/or storage platform/service).

At block 1705, the content manager receives one or more search terms from the administrator for searching across the enterprise documents. Then at decision block 1710, the content manager determines whether the administrator wants to search by user. If the administrator indicates that a search should be performed by user of the documents (block 1710—Yes), at block 1712, the content manager provides a list of users associated with the enterprise. Then at block 1714, the content manager receives the selection of users to be searched and indicates the selected users in the user interface.

If the administrator does not indicate that a search should be performed by user (block 1710—No), at decision block 1720, the content manager determines whether the administrator wants to search by folder. If the administrator indicates that a search should be performed by folder (block 1720—Yes), the content manager provides a list of folders associated with the enterprise at block 1722. Then at block 1724, the content manager receives the selection of folders to be searched and indicates the selected folders in the user interface.

If the administrator does not indicate that a search should be performed by folder (block 1720—No), at decision block 1730, the content manager determines whether the administrator wants to search by kind. If the administrator indicates that a search should be performed by kind (block 1730—Yes), the content manager provides a list of kinds that can be searched at block 1732. Then at block 1734, the content manager receives the selection of kind to be searched and indicates the selected kind in the user interface.

If the administrator does not indicate that a search should be performed by kind (block 1730—No), at decision block 1740, the content manager determines whether a filter should be added to the search criteria. If the administrator indicates that a search should be performed with another search filter (block 1740—Yes), the administrator can select from the following search filters: creation date, update date, size, owner, tag, file name, folder name, file content, type, file comment, and/or file description.

If the administrator selects filtering by creation data, at blocks 1741 and 1742, the content manager prompts the administrator for and receives the beginning date and the end date for the range of file creation dates to be searched. Then the process returns to decision block 1740 to determine whether another search filter should be added.

If the administrator selects filtering by update data, at blocks 1744 and 1745, the content manager prompts the administrator for and receives the beginning date and the end date for the range of file update dates to be searched. Then the process returns to decision block 1740 to determine whether another search filter should be added.

If the administrator selects filtering by size, at blocks 1747 and 1748, the content manager prompts the administrator for and receives the minimum size and the maximum size of the files to be searched. Then the process returns to decision block 1740 to determine whether another search filter should be added.

If the administrator selects filtering by owner, at block 1750, the content manager provides a list of owners of files associated with the enterprise. Then at block 1751, the content manager receives the selection of owners to be searched. The process returns to decision block 1740 to determine whether another search filter should be added.

If the administrator selects filtering by tag, at block 1753, the content manager provides a list of tags of files associated with the enterprise. Then at block 1754, the content manager receives the selection of tags to be searched. The process returns to decision block 1740 to determine whether another search filter should be added.

If the administrator selects filtering by file or folder name, at block 1756, the content manager prompts the administrator for and receives a term or terms in the name of the file or folder to be searched. The process returns to decision block 1740 to determine whether another search filter should be added.

If the administrator selects filtering by file content, at block 1758, the content manager prompts the administrator for and receives a term or terms in the content to be searched. The process returns to decision block 1740 to determine whether another search filter should be added.

If the administrator selects filtering by type, at block 1762, the content manager prompts the administrator for and receives a file extension to be searched. The process returns to decision block 1740 to determine whether another search filter should be added.

If the administrator selects filtering by file comment, at block 1764, the content manager prompts the administrator for and receives a term or terms in the comments to be searched. The process returns to decision block 1740 to determine whether another search filter should be added.

If the administrator selects filtering by file description, at block 1766, the content manager prompts the administrator for and receives a term or terms in the file descriptions to be searched. The process returns to decision block 1740 to determine whether another search filter should be added.

The content manager is not limited to the filters explicitly described above. Other search filters can also be provided by the content manager, for example, editor of a file, and file topic.

If the administrator indicates that no more filters are to be used in the search (block 1740—No), at block 1760, the content manager performs the search based upon the search terms and the selected filter criteria provided by the administrator and provides the results to the administrator. And at block 1770, the content manager displays the search results to the administrator. The administrator can elect to further filter the search results in a similar manner as described above.

Figure 18:
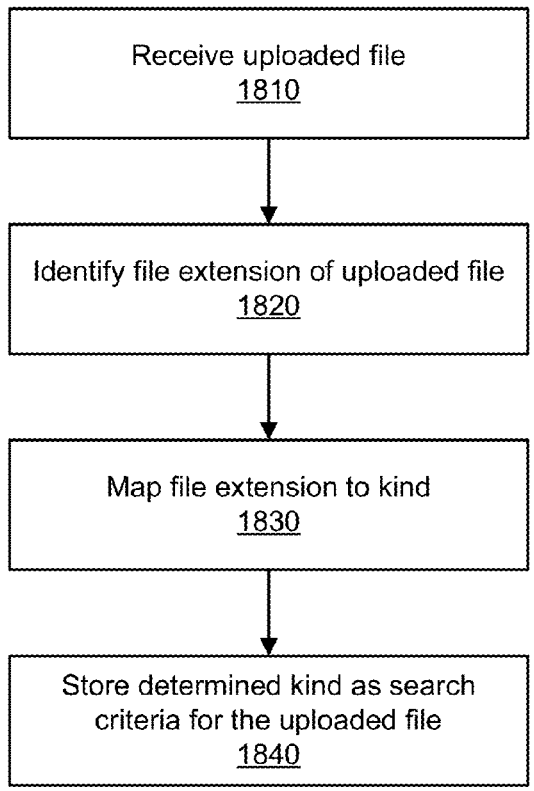
FIG. 18 depicts a flow chart illustrating an example process of identifying a kind of an uploaded file and storing the kind as a search criterion for the uploaded file.

FIG. 18 depicts a flow chart illustrating an example process of identifying a kind of an uploaded file and storing the kind as a search criterion for the uploaded file.

At block 1810, the content manager receives a file uploaded to the cloud-based platform (e.g., cloud-based collaboration and/or storage platform/service). Then at block 1820, the content manager identifies the file extension of the uploaded file.

Figure 19:
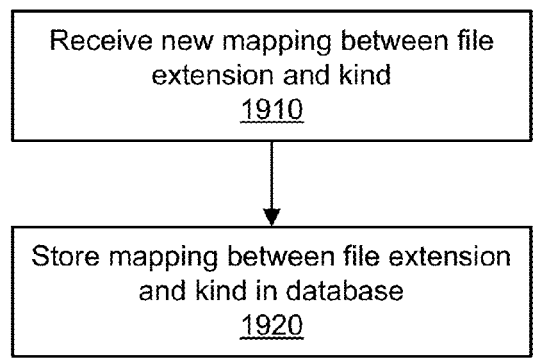
FIG. 19 depicts a flow chart illustrating an example process of storing a mapping between a file extension and a kind.

Next, at block 1830, the content manager uses the file type database to map the file extension to a specific kind of file. For example, if the file extension for the file is JPEG, the file kind would be an image file. Then at block 1840, the content manager stores the determined kind as metadata for the file to be used as a search criterion FIG. 19 depicts a flow chart illustrating an example process of storing a mapping between a file extension and a kind.

At block 1910, the content manager receives a new mapping between a file extension and a kind. Then at block 1920, the content manager stores the mapping between the file extension and the kind in the file type database. Then future files with the new file extension uploaded to the cloud-based platform (e.g., cloud-based collaboration and/or storage platform/service) can be mapped to the given kind.

Figure 20:
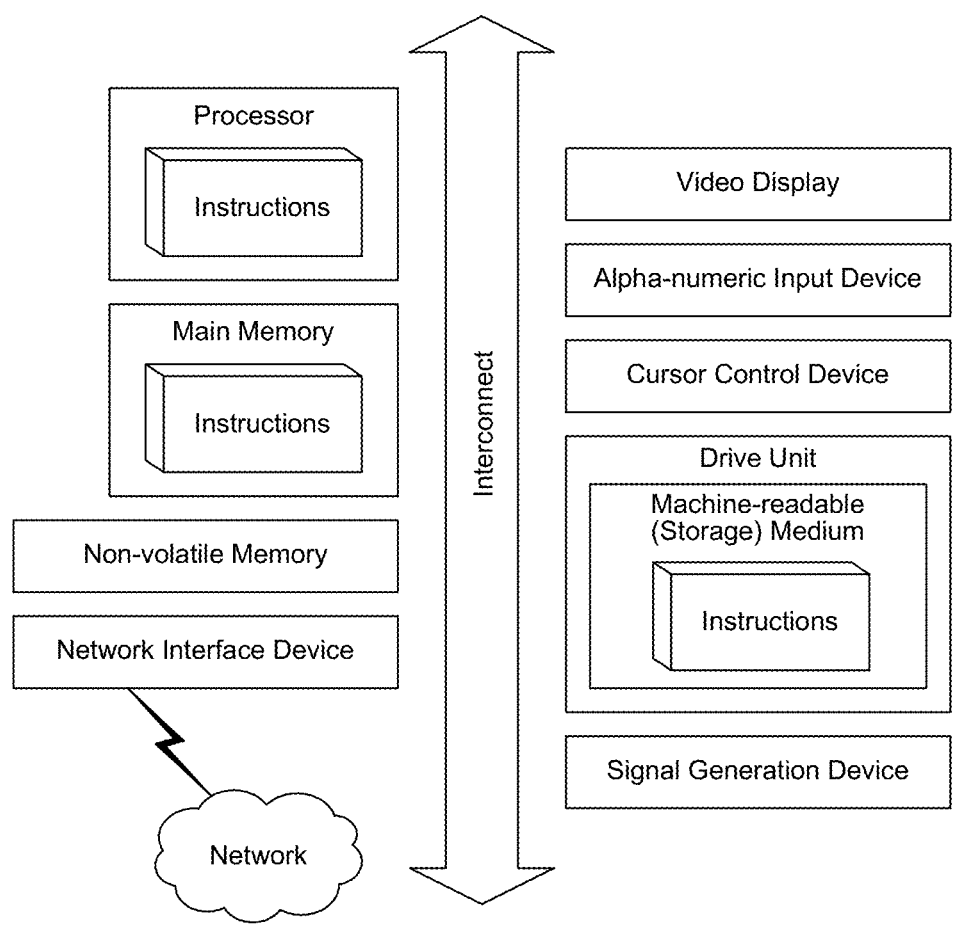
FIG. 20 shows a diagrammatic representation of a machine in the example form of a computer system within which a set of instructions, for causing the machine to perform any one or more of the methodologies discussed herein, may be executed.

FIG. 20 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the disclosure.

What is claimed is:

1. A method comprising:
   determining a first mapping between a first file extension and a file kind, and a second mapping between a second file extension and the file kind;
   storing the first mapping and the second mapping in a mapping database;
   receiving a particular file uploaded to a content repository of a cloud-based collaboration platform for an enterprise account;
   identifying a particular file extension associated with the particular file;
   determining, from the mapping database, a particular file kind to which the particular file extension maps;
   storing the particular file kind as metadata for the particular file to be used during a given search;
   responsive to a search request initiated by an administrator of the enterprise account, performing a search based on the file kind for files across users associated with the enterprise account, wherein the files are stored in the content repository of the cloud-based collaboration platform, wherein the search is performed independent of user permission, and
   wherein results of the search yield content collaborated upon among multiple of the users associated with the enterprise account.

2. The method of claim 1, further comprising:
   providing a file kind category as a filter within the content repository of the cloud based collaboration platform, the filter for selection by the administrator initiating the search on the enterprise account within the content repository of the cloud-based collaboration platform;
   upon selection of the file kind category as a filter, performing the search using the file kind category as a filter for the search.

3. The method of claim 2, wherein the enterprise account is used by multiple users and established as a customer account of the cloud-based collaboration platform.

4. The method of claim 2, further comprising:
   providing one or more additional filter categories for selection by the administrator for the search;
   performing the search using the one or more additional filter categories selected by the administrator.

5. The method of claim 1, wherein the file kind is selected from one of the following kinds: audio, document, image, presentation, spreadsheet, and video.

6. The method of claim 1, further comprising causing to be displayed the results of the search.

7. A system comprising:
   a processor;
   a memory having stored thereon instructions which, when executed by the processor, cause the system to:
   determine a first mapping between a first file extension and a file kind, and a second mapping between a second file extension and the file kind;
   store the first mapping and the second mapping in a mapping database;
   identify a particular file extension associated with a particular file that is uploaded to a content repository of a cloud-based collaboration platform for an enterprise account;

determine, from the mapping database, a particular file kind to which the particular file extension maps;

store the particular file kind as metadata for the particular file to be used during a given search;

responsive to a search request initiated by an administrator of the enterprise account, perform a search based on the file kind for files across user accounts associated with the enterprise account, wherein the files are stored in the content repository of the cloud-based collaboration platform, and wherein results of the search yield content collaborated upon among multiple of the users associated with the enterprise account.

8. The system of claim 7, wherein the instructions, when executed by the processor, further cause the system:

provide a file kind category as a filter within the content repository of the cloud-based collaboration platform, the filter for selection by the administrator initiating the search on the enterprise account within the content repository of the cloud-based collaboration platform;

upon selection of the file kind category as a filter, perform the search using the file kind category as a filter for the search.

9. The system of claim 8, wherein the enterprise account is used by multiple users and established as a customer account of the cloud-based collaboration platform.

10. The system of claim 8, wherein the instructions, when executed by the processor, further cause the system to:

provide one or more additional filter categories for selection by the administrator for the search;

perform the search using the one or more additional filter categories selected by the administrator.

11. The system of claim 7, wherein the file kind is selected from one of the following kinds: audio, document, image, presentation, spreadsheet, and video.

12. The system of claim 7, further comprising a display configured to display the results of the search.

13. A system comprising:

means for determining a first mapping between a first file extension and a file kind, and a second mapping between a second file extension and the file kind;

means for storing the first mapping and the second mapping;

means for receiving a particular file uploaded to a content repository of a cloud based collaboration platform for an enterprise account;

means for identifying a particular file extension associated with the particular file;

means for determining, from the mapping database, a particular file kind to which the particular file extension maps;

means for storing the particular file kind as metadata for the particular file to be used during a given search;

responsive to a search request initiated by an administrator of the enterprise account, means for performing a search based on the file kind for files across user accounts associated with the enterprise account, wherein the files are stored in the content repository of the cloud-based collaboration platform;

wherein, results of the search yield content collaborated upon among multiple of the users associated with the enterprise account.

14. The system of claim 13, wherein the enterprise account is used by multiple users and established as a customer account of the cloud-based collaboration platform.

15. The system of claim 13 wherein the file kind is selected from one of the following kinds: audio, document, image, presentation, spreadsheet, and video.

16. The system of claim 13, further comprising:

means for displaying the results of the search.

17. A non-transitory computer readable storage medium having programming instructions stored thereon that, when executed by one or more processors, cause a system to:

determine a first mapping between a first file extension and a file kind, and a second mapping between a second file extension and the file kind;

store the first mapping and the second mapping in a mapping database;

identify a particular file extension associated with a particular file that is uploaded to a content repository of a cloud-based collaboration platform for an enterprise account;

determine, from the mapping database, a particular file kind to which the particular file extension maps;

store the particular file kind as metadata for the particular file to be used during a given search;

responsive to a search request initiated by an administrator of the enterprise account, perform a search based on the file kind for files across user accounts associated with the enterprise account, wherein the files are stored in the content repository of the cloud-based collaboration platform, and wherein results of the search yield content collaborated upon among multiple of the users associated with the enterprise account.

* * * * *